United States Patent [19]

Hillman et al.

[11] Patent Number: 5,470,218

[45] Date of Patent: Nov. 28, 1995

[54] GRAPHICAL INTERFACE DRIVEN INJECTION BLOW MOLDING APPARATUS

[75] Inventors: Michael J. Hillman, Ocean City; Bruce E. Jacoby, Vineland; Rui M. Barbosa, Millville, all of N.J.

[73] Assignee: Wheaton Inc., Millville, N.J.

[21] Appl. No.: 88,427

[22] Filed: Jul. 7, 1993

(Under 37 CFR 1.47)

[51] Int. Cl.[6] .............................. B29C 45/77; B29C 45/78
[52] U.S. Cl. ......................... 425/144; 264/40.6; 264/40.7; 425/145; 425/149; 425/150; 425/522
[58] Field of Search ..................... 425/143, 144, 425/145, 149, 150, 522; 264/40.5, 40.6, 40.7

[56] References Cited

U.S. PATENT DOCUMENTS

| | | | |
|---|---|---|---|
| 5,173,223 | 6/1992 | Kamiguchi et al. | 425/149 |
| 5,326,246 | 7/1994 | Usui et al. | 425/145 |

OTHER PUBLICATIONS

*Personal Engineering*, Dtd. Aug. 1991, p. 7, Labtech with ICONview, Labtech, 400 Research Dr., Wilmington, Mass. 01887.
*Control Engineering*, Oct. 1989, UP/DOC Touch Control, p. 143.
*Mechanical Engineering*, Oct. 1987, pp. 53–55.
Xycom, The Hardhat Computer People, More Powerful, More Flexible brochure, date unknown, but prior to Jan. 27, 1993.
The RTM 3500 . . . from Micro Specialty Systems, Inc., P.O. Box 68, Northampton, Pa. 18067 brochure with insert, total 3 sheets, date unknown but prior to Jan. 27, 1993.
Intec Controls Corp., 130 West Street, Walpole, Mass. 02081 brochure, date unknown but prior to Jul. 28, 1992.
OPTO 22, 15461 Springdale St., Huntington Beach, Calif. 92646 brochure, date unknown but prior to Jan. 27, 1993.
The Fix, The Fully Integrated Control System From Intellution, M&D Controls Co., 9 N. Bacton Hill Rd., Frazer, Pa. 19355, pp. 1–22, date unknown but prior to Jan. 27, 1993.
*Control Engineering*, Jul. 1990, pp. 83–84, "You need a phone by Mistic Controller".
*Control Engineering*, Jul. 1990, "The Human–Machine Interface: Choices & Dilemmas", pp. 77–79.
*Control Engineering*, Jul. 1990, "Cell Controllers Proffer New Vistas for Plant Operations", pp. 47–50.
*Control Engineering*, Jul. 1990, "This is Wonderware", p. 27.

(List continued on next page.)

*Primary Examiner*—Tim Heitbrink
*Attorney, Agent, or Firm*—Ratner & Prestia

[57] ABSTRACT

An improved injection blow molding apparatus. The apparatus includes an injection blow molding machine having work stations and molds. The apparatus includes a process controller for operating the blow molding machine according to a set of processing parameters. Each processing parameter has a respective desired operating range. The apparatus includes a touch screen for inputting signals to the processor for commanding the process controller to adjust the processing parameters. Display software and hardware coupled to the process controller and the touch screen cause the monitor to display respective icons representing each processing parameter. The value of each respective processing parameter is displayed adjacent to the icon. Graphing software generates signals which are transmitted to the monitor. The monitor displays a graph of the selected processing parameter value as a function of time. The graph is plotted in response to an operator touching a portion of the touch screen beneath which the selected icon is displayed. Alarm software causes the monitor to display an alarm message. The alarm message identifies whether any one of the processing parameters is operating outside its desired operating range.

25 Claims, 30 Drawing Sheets

Microfiche Appendix Included
(10 Microfiche, 100 Pages)

OTHER PUBLICATIONS

Computer Boards, Inc., "Data Acquisition & Control", vol. 5, pp. 22–27, date unknown but prior to Jan. 27, 1993.

Barber Colman Co., "MACO 8000 The Modular Distributed Control System", pp. 1–12, 1625/DB 1-1 (Apr. 1984).

Barber Colman Co., "MACO 8000", 1625/DB 2-1, pp. 1–4 (Apr. 1984).

Barber Colman Co., "MACO 8000", 1625/DB 3-1, pp. 1–4 (Apr. 1984).

Barber Colman Co., "MACO 8000", 1625/DB 4-1, pp. 1–4 (Apr. 1984).

Barber Colman Co., "MACO 8000", 1625/DB 5, pp. 1–4 (Nov. 1984).

Barber Colman Co., "MACO 8000", 1625/DB 6, pp. 1–4 (Oct. 1984).

Barber Colman Co., CIMAC 2, "More Power for the Money" (Jan. 1989).

Barber Colman Co., "More Power for the Money", New MACO 8000 Clamp Control Module (Feb. 1989).

Barber Colman Co., MACO 8000 VA, "Plastics Manufacturing Control System" (May 1991).

Intec Controls Corp., "Paragon Control" brochure, date unknown but prior to Jan. 27, 1993.

OPTO 22, "Mistic Controller" brochure, pp. 1–24, date unknown but prior to Jan. 27, 1993.

"Introducing WinWorX. Windows that allow you to manage your process, not just look at it"; ICONICS (copyrighted 1991).

"In Touch"; Wonderware brochure, pp. 1–8, date unknown but prior to Jan. 27, 1993.

"WinWorX", ICONICS Product Brief, Apr. 1992, 4 sheets.

"Blind Nodes", ICONICS Product Brief, Sep. 1991.

"Statistical Process Control", Paragon 500/550, Jul. 1992, 7 sheets.

"Genesis Contorl Series", ICONICS, pp. 2–25, date unknown but prior to Jan. 27, 1993.

Buhl Automatic Inc. in cooperation with GE Fanuc Automation advertising brochure, "The Building block System of Retrofit Controls", Jun. 17–21, 1991, NPE '91.

M. H. Naitove, "'Artificial Intelligence' Already Taking Many Forms in Plastics Processing", Technology News in *Plastics Technology*, pp. 15–26 (Mar. 1991).

M. H. Naitove, "Great Graphics, Unlimited Flexibility For New Controls & CIM Family", Technology New in *Plastics Technology*, pp. 15–18 and 124 (Apr. 1991).

Buhl Automatic "Step–by–Step Automation" brochure, printed in Canada May, 1991.

UNI–BLOC Series—"Adaptive Process Controls for Injection Molding of Thermoplastics and Thermosets", Hunkar Laboratories, Inc. pp. 1–23 (1975).

"User's Guide", Gammaflux Inc., Series 9, pp. 1–29, date unknown, prior to Jul. 7, 1994.

Letter from Leslie L. Kasten, Jr. dated Jun 9, 1994 to Steven E. Koffs, Esquire.

GRAPHICAL INTERFACE DRIVEN INJECTION BLOW MOLDING APPARATUS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A microfiche appendix is included in this application containing 10 microfiche. Each microfiche, numbered one to 9, contains 83 frames plus one test target frame, for a total of 84 frames per microfiche. The last microfiche, numbered 10, contains 15 frames plus one test target frame for a total of 16 frames.

BACKGROUND OF THE INVENTION

1. Field of the Invention

The present invention relates to equipment for injection blow molding hollow thermoplastic containers, and in particular to molding equipment operated under automatic computer control.

2. Description of the Related Art

Machines for injection blow molding (IBM) of hollow thermoplastic containers are known. In an IBM machine, a preform or parison is injection molded into a mold, around a core rod. The injection mold is opened and the core rod and the parison are transferred to a blow molding station. The parison is then blown into the shape of the final article inside the blow mold. The blow mold is opened and the blown article is advanced to a station where it is stripped off the core rod. After injection of the plastic to form a parison, but before blowing the parison into a finished article the parison must usually be conditioned for at least a short period of time in order to allow equilibration of the plastic to a proper temperature to enable the blowing of the article.

Plastic material may be fed through a dryer to remove moisture and is then placed in a hopper. The material falls, under its own weight, into a barrel with a reciprocating feed screw called an injection screw. The injection screw rotates in the barrel, advancing the material. The material melts due to the shear effect from the rotating barrel, and from the temperature in barrel. At the forward end of the injection screw is a ram adapted to inject the melted material (also referred to as the melt) into the parison mold. The forward and backward reciprocating motion of the injection screw causes the injection of a predetermined amount of plastic into a parison mold.

In a widely used type of injection blow molding machine, the work pieces (parisons) are first injection molded then blown and removed at (typically 3 or 4) successive work stations. Transfer between work stations is accomplished by a turret which rotates about a vertical axis. Work stations are radially disposed about the axis. The turret has a number of sides equal to the number of work stations. Core rods radially project from each of the turret sides towards the respectively facing work stations. A different operation is performed at each work station, and parisons or finished articles are moved from one station to another when all work has been completed in each cycle.

In order to provide closed loop control of the operation of the IBM machine, the machine is equipped with a plurality of sensors and at least one process controller. The process controller(s) determines the sequence of activities performed to construct a container, temperature setpoints, data acquisition and injection parameters. The process controller(s) also collects data from the sensors and employs predetermined criteria to apply corrective adjustments to the process. For example, one of the most widely used process controllers in injection blow molding systems is the proportional integral derivative (PID) controller. The PID controller, as its name implies, applies a gain to its input signal which has three components: the first component is proportional to the input signal, the second component varies with the integral of the input signal, and the third component varies with the derivative of the input signal. The input signal to the controller depends on predetermined setpoint values used for the individual processes, and the deviations from the setpoints.

The process controller is only effective when it is properly commanded to apply appropriate adjustments to the process. Effective use of the process controller depends on the operator's ability to assess the "quality" of the process for a particular controller configuration. The operator must assimilate large quantities of trend data, often within a short period of time. The operator needs a clear understanding of how the machine is performing and which parameters are not within desired limits before he or she can adjust the parameters or limits.

Software for operating the process controller has left much to be desired in several areas, particularly in systems which are used to operate several IBM machines with respective process controllers. Typically, data are stored locally in a respective processor coupled to each process controller. To monitor the data from a central station, the requested data must be fetched from the storage at the machine where the data were collected, and the data are then transmitted over a network to the central station. This causes erratic traffic loading on the network. To accommodate the traffic loads, a separate fileserver is often required.

Another problem in previous systems is the ability to respond appropriately when one of the processors reboots or encounters a power failure. Typically, the software controlling the process restarts automatically, but does not re-establish a network connection. As a result, subsequent attempts to access any services over the network (e.g., to print data from an IBM machine on a printer at the central station) may fail.

SUMMARY OF THE INVENTION

The present invention is an improved injection blow molding apparatus. The apparatus includes an injection blow molding machine having a plurality of work stations and a plurality of molds. The molds include parison molds and blow molds. Work pieces are first injection molded, then blown and removed at successive work stations. The apparatus includes control means for operating the blow molding machine in accordance with a set of processing parameters. Each processing parameter has a respective desired operating range.

The improvement comprises a monitor having a touch screen for transmitting signals to the control means. The control means use the signals for adjusting processing parameters. The processing parameters include set points and alarm limits. The monitor and touch screen also provide means by which an operator retrieves data and displays the data in a variety of graphical formats.

Display means are coupled to the control means for causing the monitor to display a plurality of icons in the form of a pictures of respective portions of said machine. The icons represent a plurality of processing parameters. The values of the selected processing parameters are displayed adjacent to the respective icons. A processing parameter is selected for graphing by touching the touch screen at the location of its respective icon.

Graphing means transmit signals to the monitor. These signals cause the monitor to display a graph of the selected processing parameter value. The graph is plotted as a function of time. The graph is plotted in response to an operator touching a portion of the touch screen beneath which the selected icon is displayed.

Alarm means are coupled to the control means for causing the monitor to continuously display an alarm message. The alarm message identifies whether any one of the processing parameters is operating outside its desired operating range. In the event of multiple alarms, each alarm is displayed in succession. The alarm message background color indicates whether the high alarm limit or the low alarm limit is exceeded.

DETAILED DESCRIPTION

Figure 1:
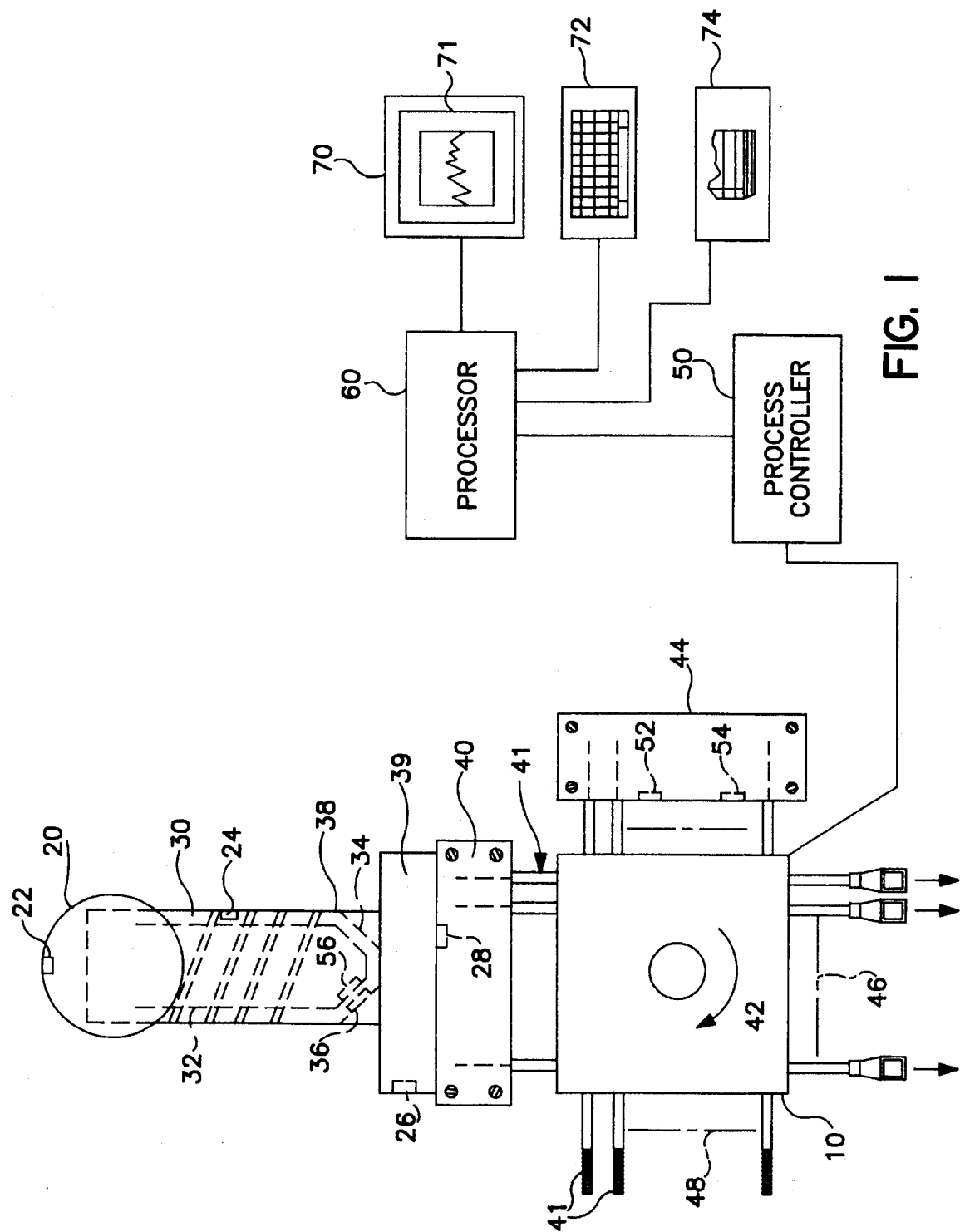
FIG. 1 shows an exemplary injection blow molding apparatus in accordance with the invention.

FIG. 1 is a block diagram of an exemplary injection blow molding apparatus in accordance with the invention, including a plan view of injection blow molding (IBM) machine 10. Containers are molded in a machine 10, which may be a model 901 IBM manufactured by Wheaton Industries of Millville, N.J. or other machine having similar capabilities. If the plastic material is hygroscopic, it enters the machine through a dryer 20 in the form of a temperature controlled hopper, which removes moisture from the material. The material drops from dryer 20 into a plastifier 38 which has a heated barrel 30. Inside of barrel 30 is a reciprocating injection screw 32. Injection screw 32 has two functions: it advances the material between dryer 20 and manifold 39; and the shearing action caused by turbulent motion within the material, in combination with the barrel temperature, heats the material. At the forward end of barrel 30 is a nozzle 34.

Nozzle 34 feeds the material into a manifold 39 that delivers the material into a multi-cavity parison mold 40, in which parisons are injection-molded on each of core rods 41. When the parisons are ready to be transferred, parison mold 40 opens, and turret 42 is indexed 90 degrees, which carries the parisons on the core rods 41 clockwise to the machine's second (blow molding) work station 44. At station 44, air is blown into the parisons, forming containers. At the completion of the blow-molding step, turret 42 is again indexed 90 degrees, advancing the completed containers to a third work station, the ejection station 46. The containers are removed and turret 42 is indexed to a fourth work station 48, the conditioning station at which the core rods 41 are heated or cooled to prepare them for injecting material to form the next set of parisons at parison mold 40. As shown in FIG. 1, stations 40, 44, 46 and 48 may all be active concurrently, forming a pipelined process. Containers at different stages of fabrication are present in the system at the same time.

IBM machine 10 is outfitted with a plurality of sensors for collecting processing parameter data. For example, temperature sensor 22 measures dryer 20 temperature. Temperature sensor 24 measures barrel 30 temperature. Temperature sensor 36 measures nozzle 34 temperature. Temperature sensor 26 measures manifold 39 temperature. Injection mold 40 has temperature sensor 28. Blow mold 44 has temperature sensor 52 and air pressure sensor 54. Injection screw 32 has a temperature sensor 56. The sensors are conventional and are commercially available. The temperature sensors may include thermocouples, resistance temperature detectors and thermistors. The pressure sensor may be a piezoelectric device. Additional temperature and pressure sensors may be included.

In addition to directly measured quantities such as temperature and pressure, it is desirable to measure time delays encountered at each stage of container fabrication. Because the processes performed in plastifier 38, injection mold 40, blow mold 44, ejection station 46 and conditioning station 48 are all performed concurrently, excessive time delay in any one of these processes may reduce the overall production rate of the system. These time delays may be measured by fetching the time from a system clock (not shown) upon the occurrence of each monitored event.

The apparatus also includes control means for operating machine 10 in accordance with a set of processing parameters, each processing parameter having a respective desired operating range. The control means include at least one process controller 50 and a processor 60. Process controller 50 is a conventional programmable controller, and may be a Mistic™ Controller marketed by the Opto 22 Corporation. The controller 50 includes hardware and software for controlling the sequencing of each operation performed by machine 10. Additionally, controller 50 maintains the processing parameters (temperatures, pressures, motor speeds) at desired values and adjusts the processing parameters upon occurrence of predetermined events. Controller 50 may also control the injection of the melt into injection mold 40. In the exemplary embodiment, all of the above functions are programmed into a Mistic™ controller using the Cyrano language. Alternatively, the injection process may be controlled by a separate process controller, (not shown) or by dedicated hardware.

Beginning with the power on sequence, process controller 50 maintains the machine components stationary until the hydraulic pump (not shown) which pumps oil to the injection screw 32 is operating. Furthermore, the process controller will not allow operation of the IBM machine 10 in automatic mode until all temperatures, pressures and other processing parameters are in their desired operating ranges. For example, if the barrel temperatures are too low, the process controller will not allow operation of the injection screw 32. In another example, if the hydraulic oil temperature is not within range, the controller will not allow the machine to be run in automatic mode.

Once the hydraulic pump is on and the parameters are within their desired operating ranges, the process controller begins automatic operation of the IBM machine. Once automatic operations begin, the process controller does not permit return to manually controlled operations while the IBM machine components are in motion, to avoid damage to the equipment or harm to personnel.

In steady-state operations, process controller 50 activates each part of the production process at the appropriate instant. For example, core rod 41 is conditioned (e.g., subjected to a heated or cooled airstream for a predetermined length of time) before rotating turret 42 to move core rod 41 to the injection station. At injection station, the melt is injected into mold 40, to form a parison. The parison is usually conditioned for a short period of time in order to allow equilibration of the plastic to a proper temperature to enable blowing of the container. Turret 42 is rotated to move the parison to blow mold 44, where it is blown to its final shape through the injection of air at a predetermined temperature and pressure. Then the completed container is moved to an ejection station 46, where it is ejected from core rod 41. The process controller determines the period of time allocated to each of these activities, and the order in which they are performed.

A processor 60 and monitor 70 equipped with a touch screen 71 or other pointing device provide the integrated control system (ICS) interface between the human operator and process controller 50. Processor 60 sends updated setpoints to process controller 50. Controller 50 sends processing parameter value data to processor 60, which are stored in the disk drive of processor 60 (not shown). Processor 60 is capable of multi-tasking, to support simultaneous data acquisition from a plurality of data sources. Processor 60 may be a conventional computer based upon the 80386 chip or the 80486 chip, both manufactured by the Intel Corporation. The faster 80486 processor provides quicker response and enhances the real time monitoring of injection, timers and other parameters.

Processor 60 may include a known graphical user interface (GUI) operating system which supports multitasking, such as the Windows™ graphical environment developed by the Microsoft Corporation for use with the disk operating system (DOS) environment. In the exemplary embodiment, an additional commercially available package, the Visual Basic language by the Microsoft Corporation is used for the development of the operator interface software including the unique icons. An icon is a symbol on a monitor screen that a user can select with a pointing device (e.g., a touch screen or mouse) to select a particular operation. In the present invention, the user selects an operation by touching the touch screen 71 at the location where the icon is shown on the monitor. It is understood by those skilled in the art that other commercially available graphical user interfaces may be used to provide similar functionality, although the application software would be modified. For example, an X-Windows graphical user interface may be used on processors running the UNIX™ operating system.

As noted above, the exemplary embodiment uses a monitor 70 equipped with a touch screen 71 coupled to processor 60 for selecting icons. The icons may be created using known techniques, such as through the use of an icon editor within the Windows™ environment, In the exemplary embodiment, additional "pictures" are created using Microsoft's Paintbrush™; these "pictures" are used to perform the same function as the icons generated by the icon editor.

Touch screens are known in the art. Touch screens generate coordinate data when a user's hand or a device approaches or contacts the surface of the monitor, thereby allowing the user to interact with the processor 60 without entering commands from a keyboard. Some touch screens consist of a monitor surface overlaid by two sheets of transparent material, such as Mylar™ and glass, with metallic coating on their inner surfaces. When the screen is touched, electrical contact is made between the flexible outer sheet and the rigid inner sheet. Other touch screens use a grid of intersecting infrared (IR) beams that, when interrupted, generate coordinate data representing the selected point on the surface. The IR beam type screen does not require actual touch; approaching the screen area is sufficient. Another type of touch screen uses the voltage change at a point where the monitor screen is touched. Any of these touch screen types may be used. A conventional touch screen driver program executes in processor 60. For a command button (or icon) on a touch screen, touching the button (or icon) is synonymous with selecting the button (or icon).

In accordance with the present invention, display means, including hardware and software within processor 60 causes monitor 70 to display a series of graphical menus for adjusting and monitoring the activities of IBM machine 10. The microfiche appendix includes a listing of the software which is used to create the displays.

Figure 2:
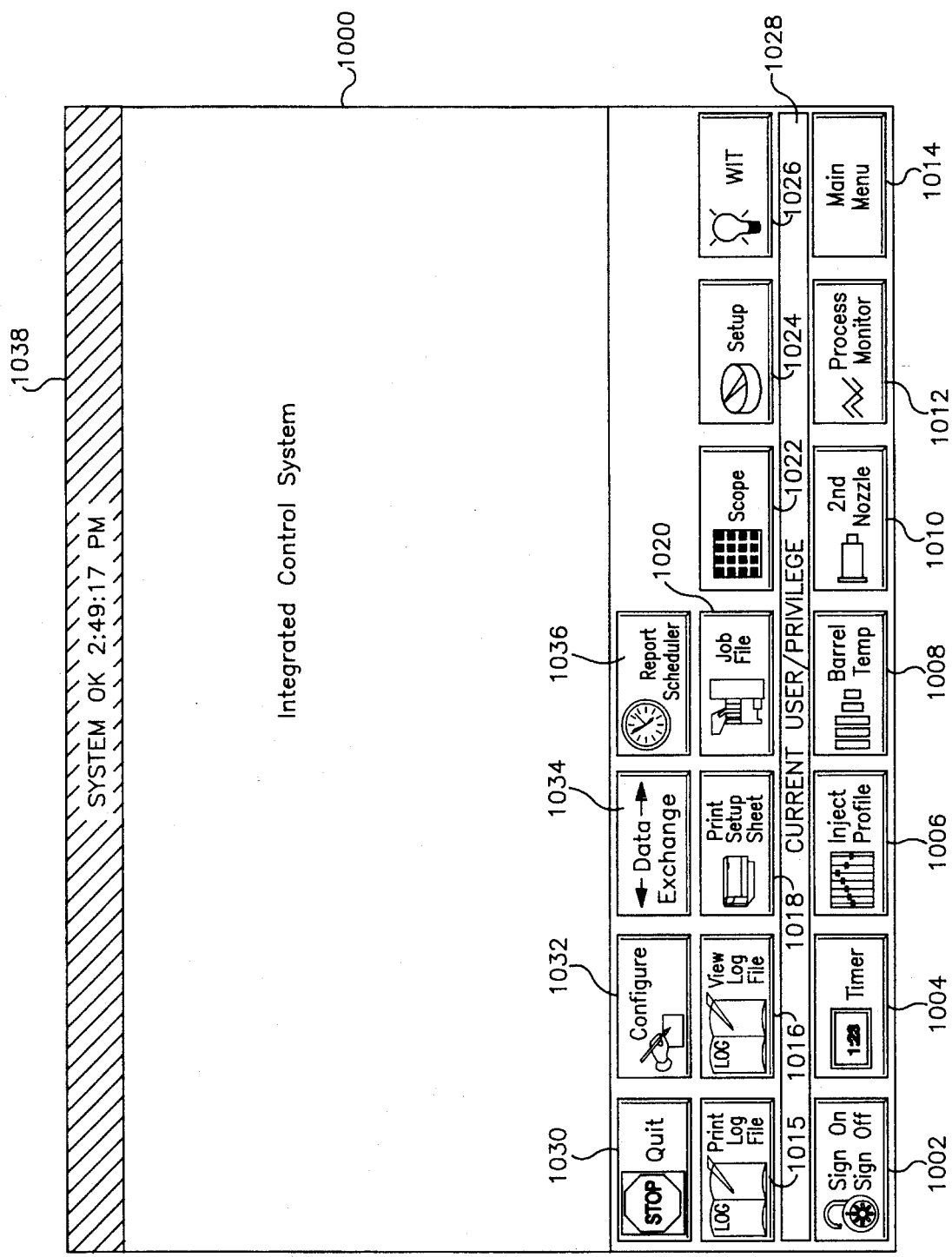
FIG. 2 through FIG. 12 show operator interface windows for controlling and monitoring the apparatus shown in FIG. 1.

FIG. 2 shows the main menu 1000 of the Integrated Control System (ICS). Window 1000 includes two main regions. At the top is an alarm field 1038. At the bottom of menu 1000 are several command buttons 1002–1026 and 1030–1036. These command buttons are selected to cause monitor 70 to display further menus and submenus for monitoring and adjusting the blow molding process. A user identification field 1028 displays the identification of the current user, and the capabilities (privileges) associated with the user.

Alarm field 1038 displays alarm messages against a background field. An alarm message is displayed whenever one or more parameters are operating outside of its prescribed alarm limits. The alarm message is even displayed when there is no user logged onto the ICS. Processor 60 includes hardware and software which form alarm means, transmitting to the monitor 70 signals which cause the alarm message to be displayed as text on a background field as shown. The background field has a first color (Preferably green) while each respective processing parameter value is within its respective desired operating range. The background field has a second color (Preferably red) while any one of the processing parameter values exceeds a maximum value in the desired operating range. The background field has a third color (Preferably blue) while any one of the processing parameter values is less than a minimum value in the desired operating range.

Figure 17:
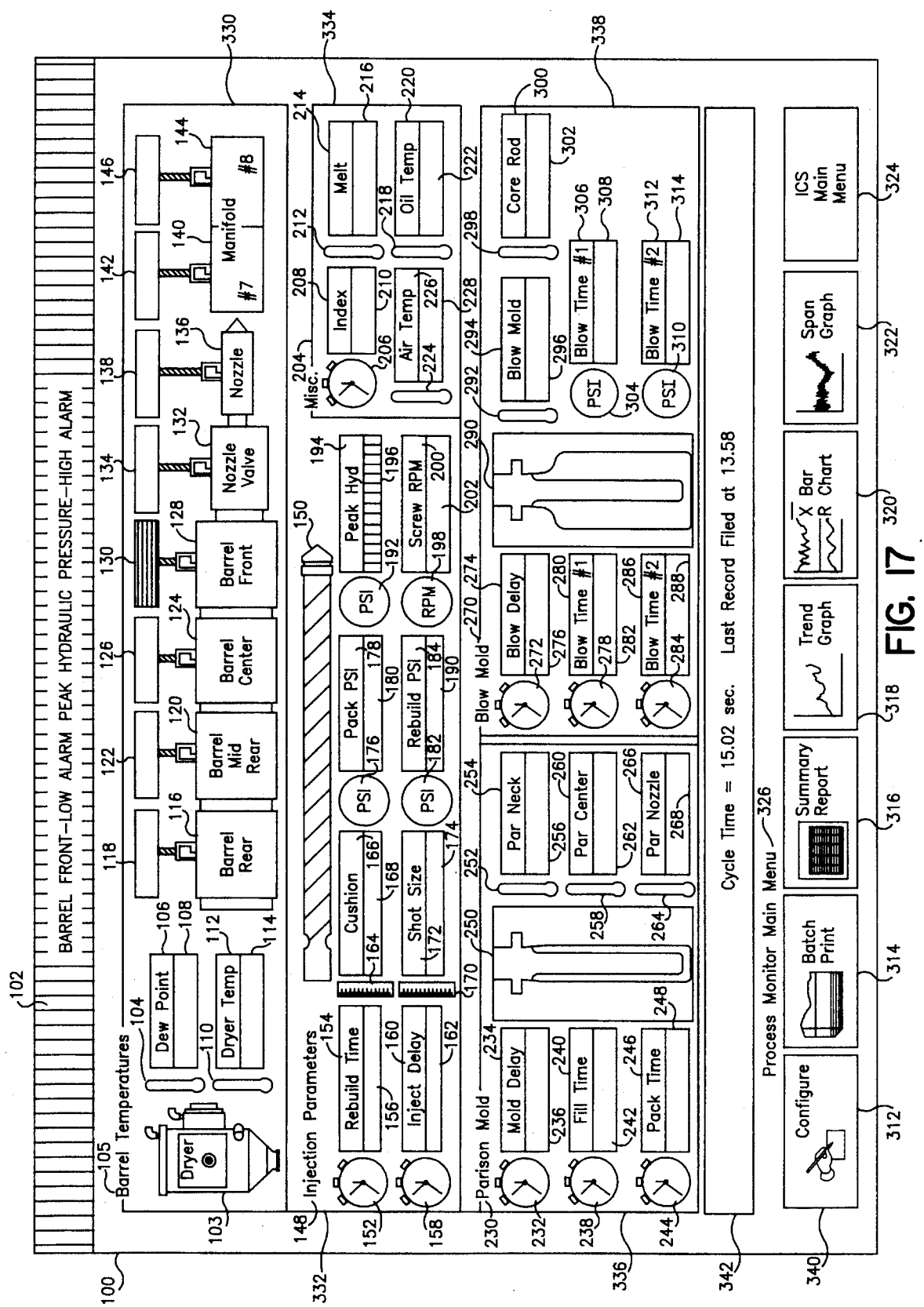
FIG. 17 shows a process monitor menu window used in the apparatus shown in FIG. 1.

As shown in FIG. 17, it is common for two parameters to be outside of their desired ranges, with one parameter above its high alarm limit, and the other parameter below its low alarm limit. In the exemplary embodiment, the background field is then set to the second color (e.g., red). A variation (not shown) of the exemplary embodiment includes a different background field when both high and low alarm limits are exceeded. This may be a fourth color or a pattern. Another variation alternates between displaying separate alarm messages for each respective alarm limit exceeded, using the appropriate red or blue background for each respective high and low limit exceeded.

Referring again to FIG. 2, the operator has several command buttons from which to choose. Selecting each command button causes execution of a respectively different program. These command buttons belong in two main functional groups. The first group is the actual operator interface for controlling machine 10. The operator interface functions are executed by selecting buttons to adjust timers 1004, the injection profile 1006, barrel temperature profile 1008, the secondary nozzle heat zones 1010, injection display 1022, machine setup 1024, and to configure setpoints and alarm limits 1032. The second main function is the process monitor, executed by selecting button 1012. An additional set of command buttons is provided for executing auxiliary service programs, such as log file print 1015, log file view 1016, print setup 1018, job file 1020, help 1026, data transfer 1034 and report scheduling 1036.

Another feature of the system is the provision of password protection. Each user has a set of capabilities associated with his or her password. The capability level of the user is displayed in field 1028. These capabilities are grouped into four different levels to protect the integrity of the blow molding process. A programmer has the capability to access all screens, configurations and setpoints. A supervisor has the capability to access all screens and setpoints except for the system configuration screen 1250 shown in FIG. 8 (and sub-menus called from the configuration screen 1250). Temperature setpoint changes by a supervisor are limited to a maximum of 10 degrees per change. An operator has the same capabilities as a supervisor, except that no changes are allowed to processing parameters which affect the plastification process. Other personnel only have the capability to access the screens that display data; no changes are allowed and the configuration screen cannot be accessed by these personnel.

Figure 3:
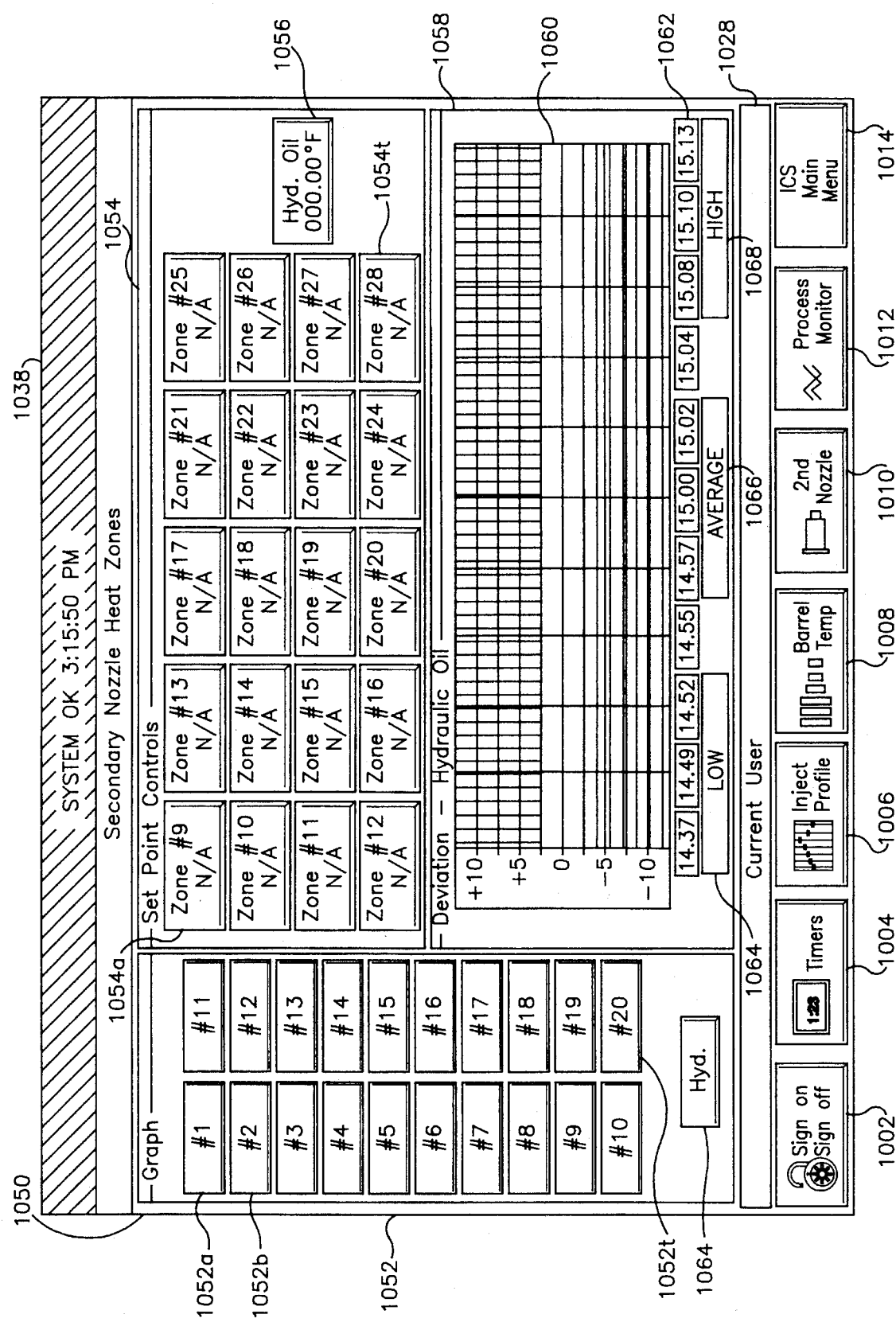

Referring to FIG. 3, there is shown the secondary nozzle heat zone window 1050 of the operator interface, which is displayed when button 1010 is selected from a window such as main menu 1000. The temperature profile in the secondary nozzle is particularly important for process quality, so this screen is used to summarize the status of the secondary nozzle. Window 1050 allows the operator to access secondary nozzle data and modify its performance from one display. Several of the fields displayed in main menu 1000 are also displayed in window 1050. Alarm field 1038, user identification field 1028, and command buttons 1002–1014 are also displayed. The command buttons at the bottom allow the operator to switch between any of the respective programs selected by these buttons. Selecting button 1014 returns the operator to the main menu 1000. These common fields also appear in the windows shown in FIG. 4 through FIG. 7, but the description of the common fields is not repeated in the discussion of each figure, At the left side, in region 1052, an array of buttons 1052a–1052t allow the operator to select one of twenty temperature zones to be displayed on a deviation graph 1060. The graph 1060 displays the deviation of the selected parameter from its setpoint over time, as well as low, average and high values. Another button 1064 allows selection of the hydraulic oil temperature for display. At the right, near the top, region 1054 includes set point control buttons 1054a–1054t, plus hydraulic oil control button 1056. Selecting one of these buttons causes the display of an additional window for adjusting the selected setpoint.

Figure 4:
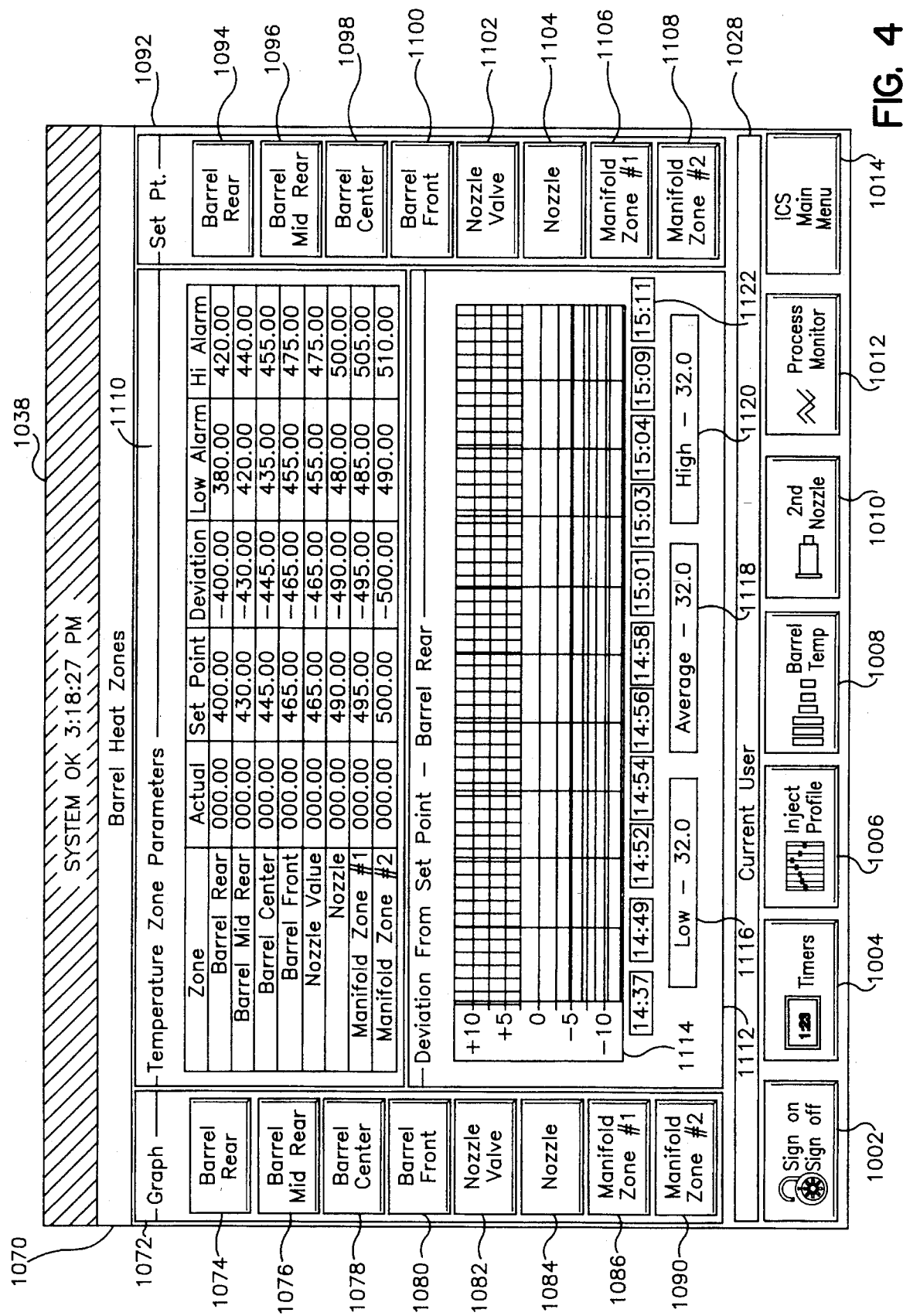

FIG. 4 shows a barrel heat zone window 1070 which is displayed when button 1008 is selected from window 1000 or another window. Because the process quality is heavily dependent on controlling conditions in the barrel of the injection screw, the primary parameters used to monitor and adjust the barrel zones are summarized in a single menu 1070. Selecting one of the buttons 1074–1090 in the graph region 1072 at the left of window 1070 causes a graph 1114 of the deviation of the selected parameter from its setpoint to be displayed. Selecting one of the buttons 1094–1108 in the set point region 1092 at the right side of the window 1070 causes a setpoint configuration window to be displayed to adjust the selected parameter.

Figure 5:
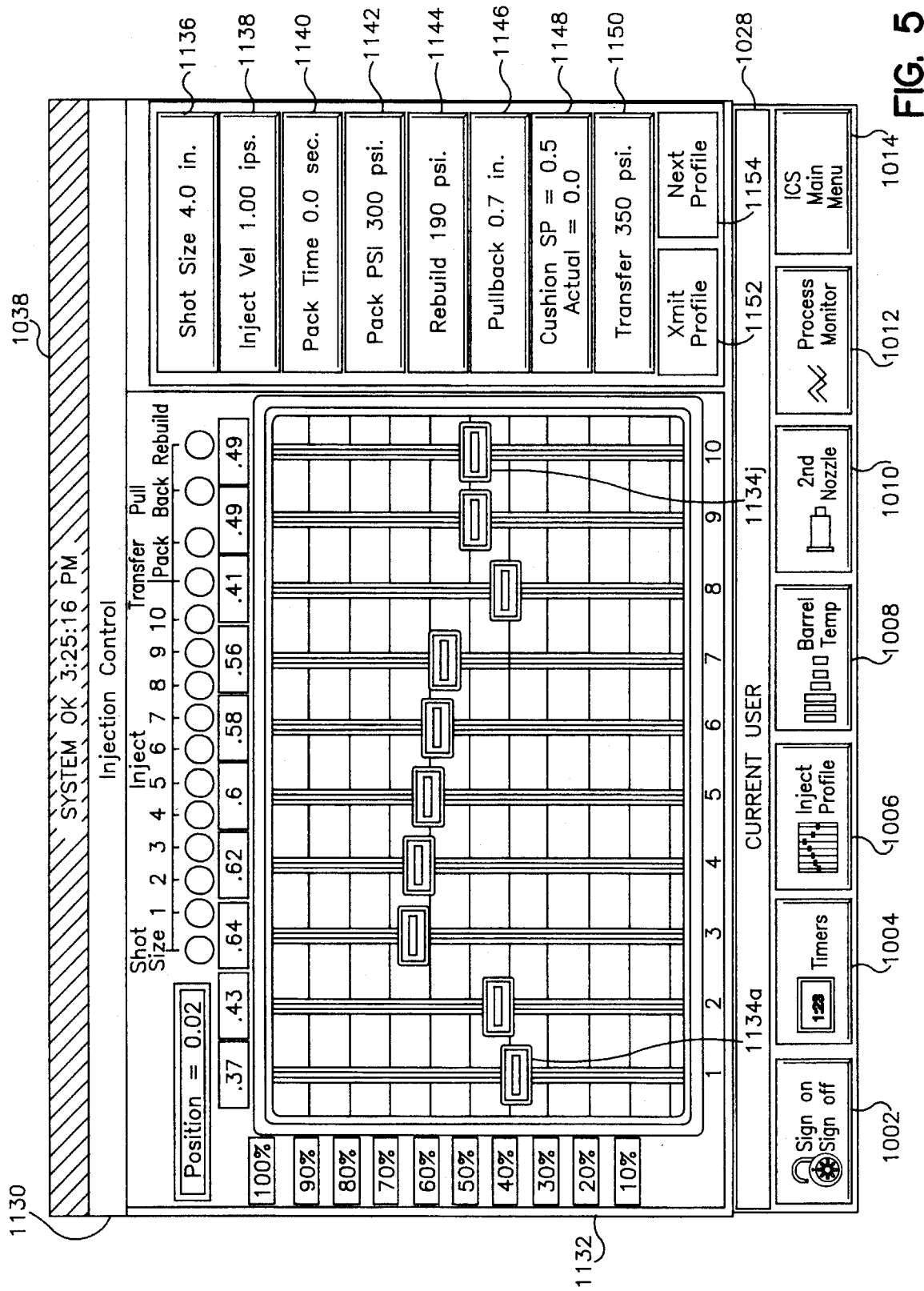

FIG. 5 shows the injection control window 1130 which is displayed when button 1006 is selected from window 1000 or another window. This window is used to adjust several parameters affecting the injection of the melt into the injection mold 40. An injection profile box 1132 includes a set of 10 slideable control switches for adjusting the fraction of the inject velocity applied during ten different intervals in the injection of a single shot. When the desired inject velocity profile has been entered, the user selects the transmit profile button 1152 to send the velocity profile data to the process controller. When the next profile button 1154 is selected, eight slideable control switches (not shown) similar to those shown in FIG. 5 are displayed. These eight switches are used to control the pack pressure profile over time. In normal operation, using the exemplary control system, the injection screw is initially controlled using the inject velocity profile. Subsequently, the control may switch over to use the pressure profile.

Other selectable parameters are displayed on the right of injection control window 1130, including shot size, 1136, injection velocity 1138, pack time (between injection and pullback of the ram) 1140, maximum pack pressure 1142, rebuild time 1144, pullback distance 1146, cushion 1148, and transfer pressure 1150. Each button includes the current value of the respective parameter.

Figure 6:
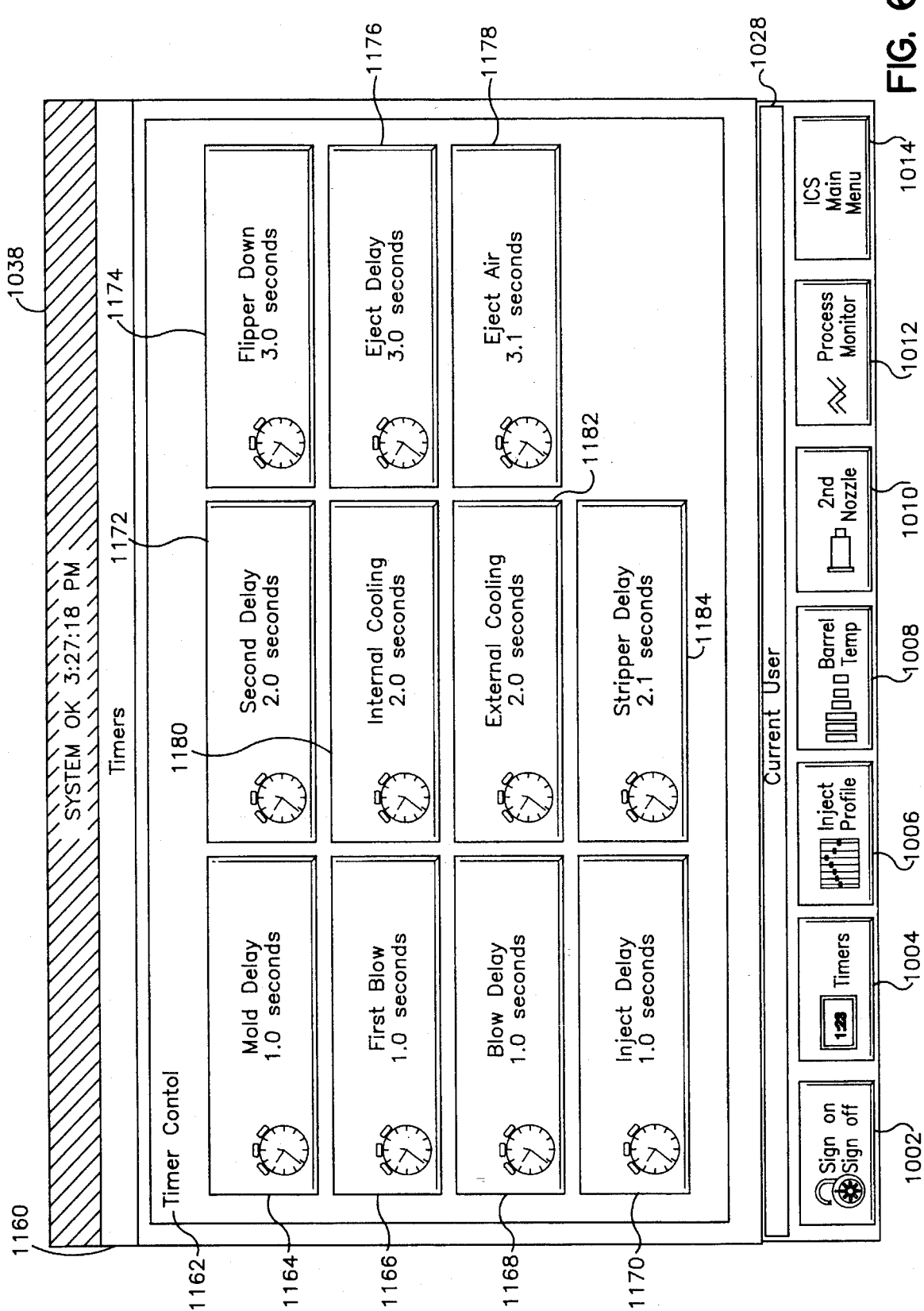

FIG. 6 shows a timer control window 1160 which is displayed in response to selection of button 1004 from window 1000 or another window. The window includes several buttons for adjusting the injection mold delay 1164, injection mold blow time 1166, blow delay 1168, inject delay, second blow delay 1172, internal cooling within the mold 1180, external cooling 1182 on the core rods, stripper delay 1184, flipper down time 1174, eject delay 1176 and eject air time 1178.

Figure 7:
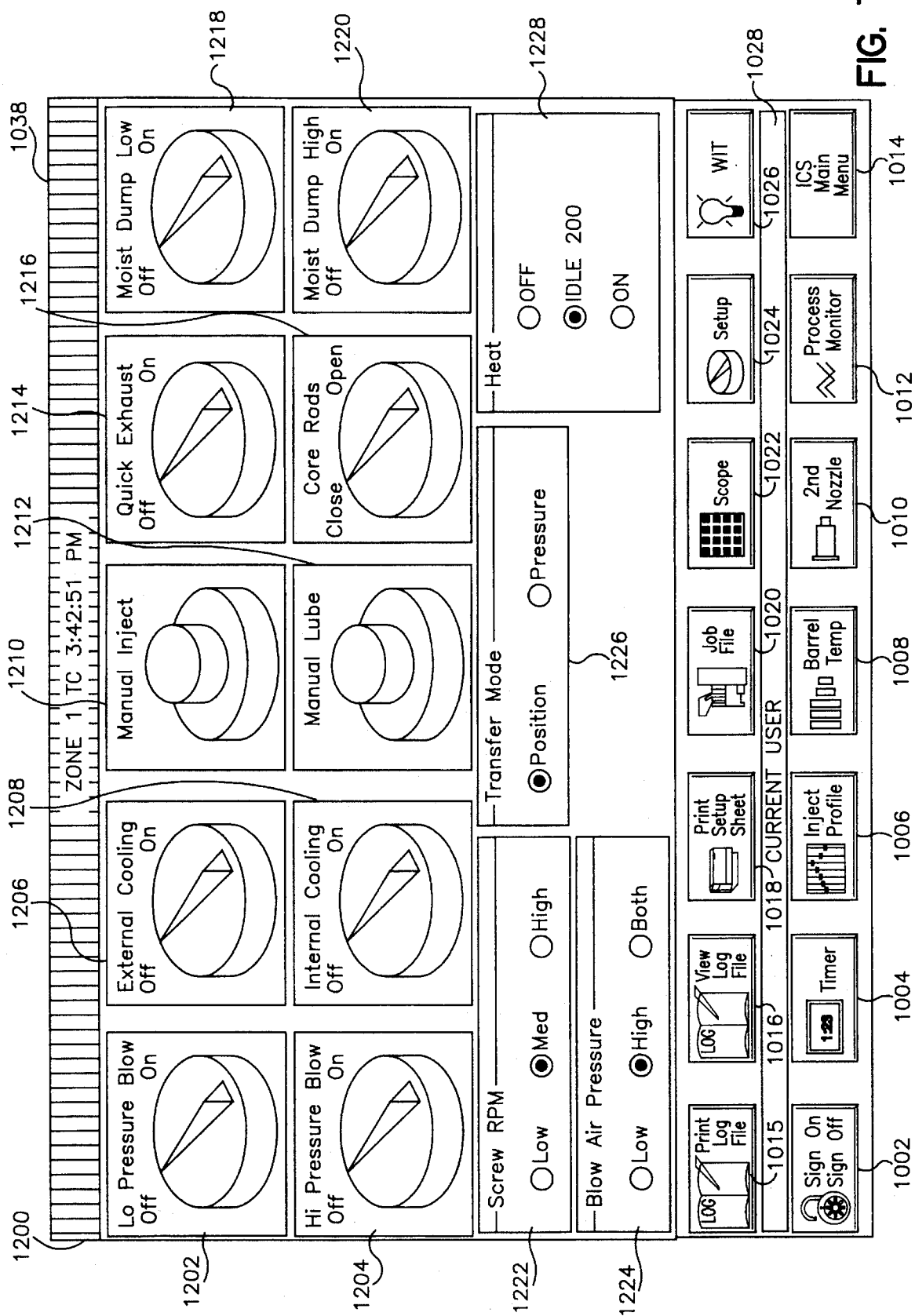

FIG. 7 shows an IBM machine setup window 1200 which is displayed in response to selection of button 1024 from another window. This window provides the operator the capability to vary several configuration parameters of machine 10. These include screw rotational speed 1222, blow air pressure 1224, transfer mode 1226, and heat 1228. These parameter values are used when the IBM machine 10 is controlled in automatic mode. The screw rotational speed control 1222 functions just as its name implies. Control 1224 allows selection of either or both of the low and high blow air pressure airstreams during the blow operation. The transfer mode control 1226 determines which parameter, the injection screw 32 position or the transfer pressure, is used for determining when the injection mold 40 has been filled completely. Field 1228 determines what temperature control is applied to the barrel. If the heats off button 1228a is selected, the temperature is not controlled actively. If the idle button 1228b is selected, all of the temperatures are maintained at 200 degrees (a powered-down condition to allow the IBM machine to be returned to a ready for operation state in a short period of time). If the on button 1228c is selected, then the temperatures in the barrel are controlled in accordance with the values stored in the process controller.

Referring again to FIG. 5, the cushion field 1148 includes the actual position of the ram at the end of pack. If the transfer mode 1226 switch shown in FIG. 7 is set to pressure control, then the operator typically is interested in the actual cushion value at the time that the desired pressure is achieved. This value is displayed in field 1148 of the injection control window 1130 after pack if window 1130 is selected and displayed.

Menu 1200 shown in FIG. 7 also shows several manual switches which may be used to control IBM machine 10 manually. Buttons 1202 and 1204 for turning low and high blow air pressure on or off are self explanatory. Switches 1206 and 1208 control the application of external cooling to the core rods 41 and internal cooling in the injection mold 40, respectively. Selecting the manual inject button 1210 causes the injection screw 32 to immediately begin an injection cycle to inject, pack, pullback and rebuild the shot. The manual lube causes lubricant to be immediately applied to the injection apparatus. In automatic mode, this would be done periodically (e.g., every 90 minutes) without operator intervention. The moisture dump controls 1218 and 1220 cause the system to empty the receptacles which trap water from the low and high pressure blow air streams, respectively. A quick exhaust control 1214 and core rod control 1216 are also provided.

Figure 8:
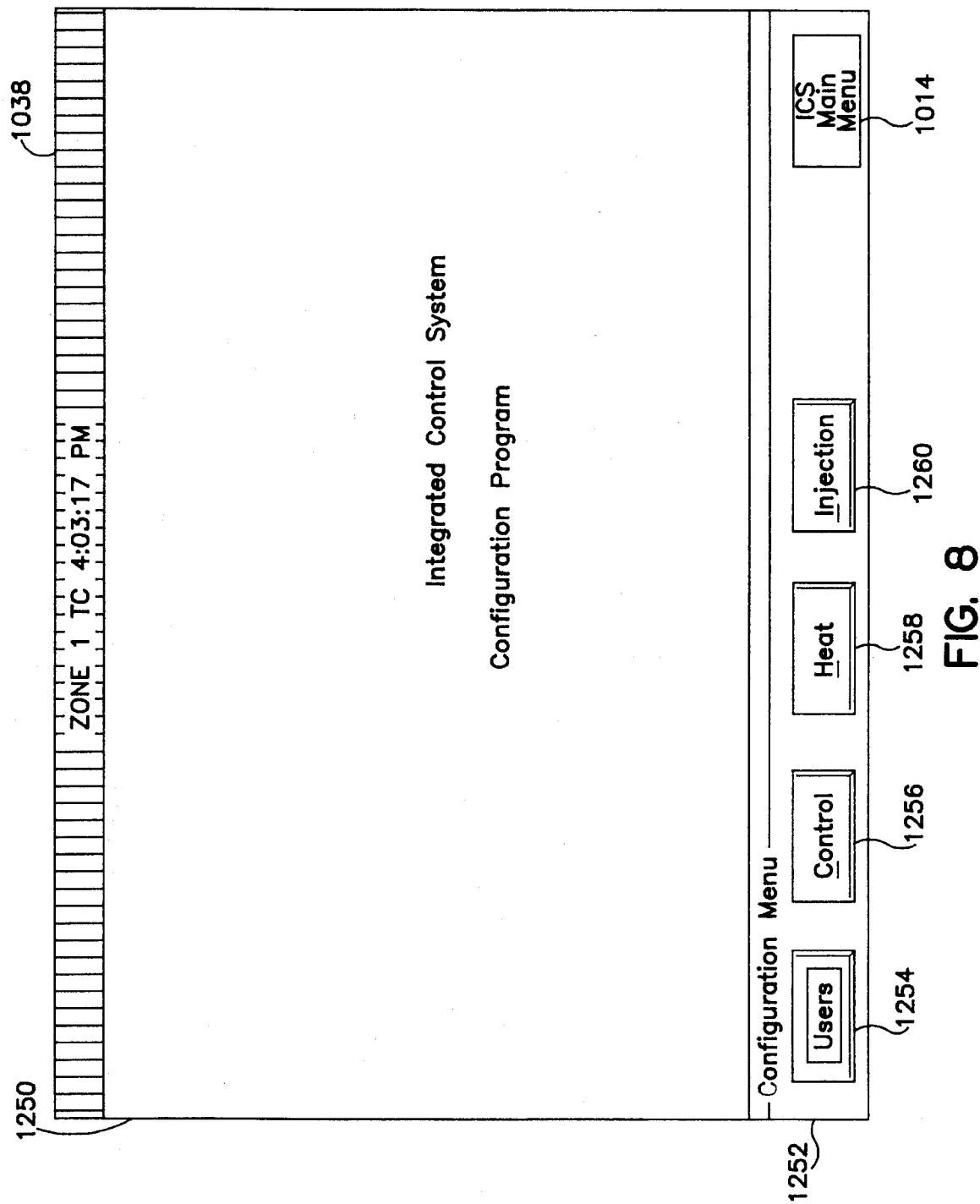
Figure 10:
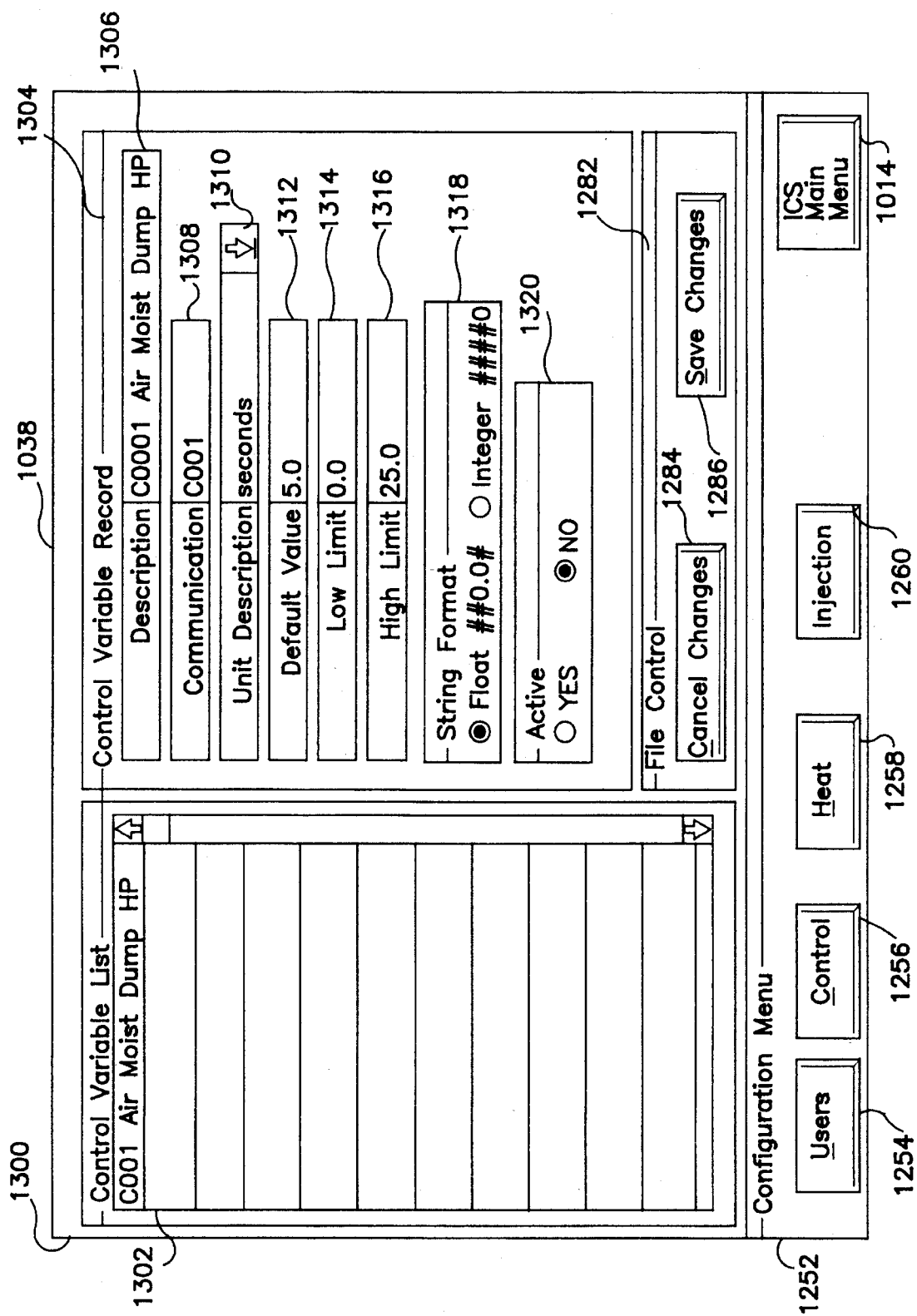
Figure 11:
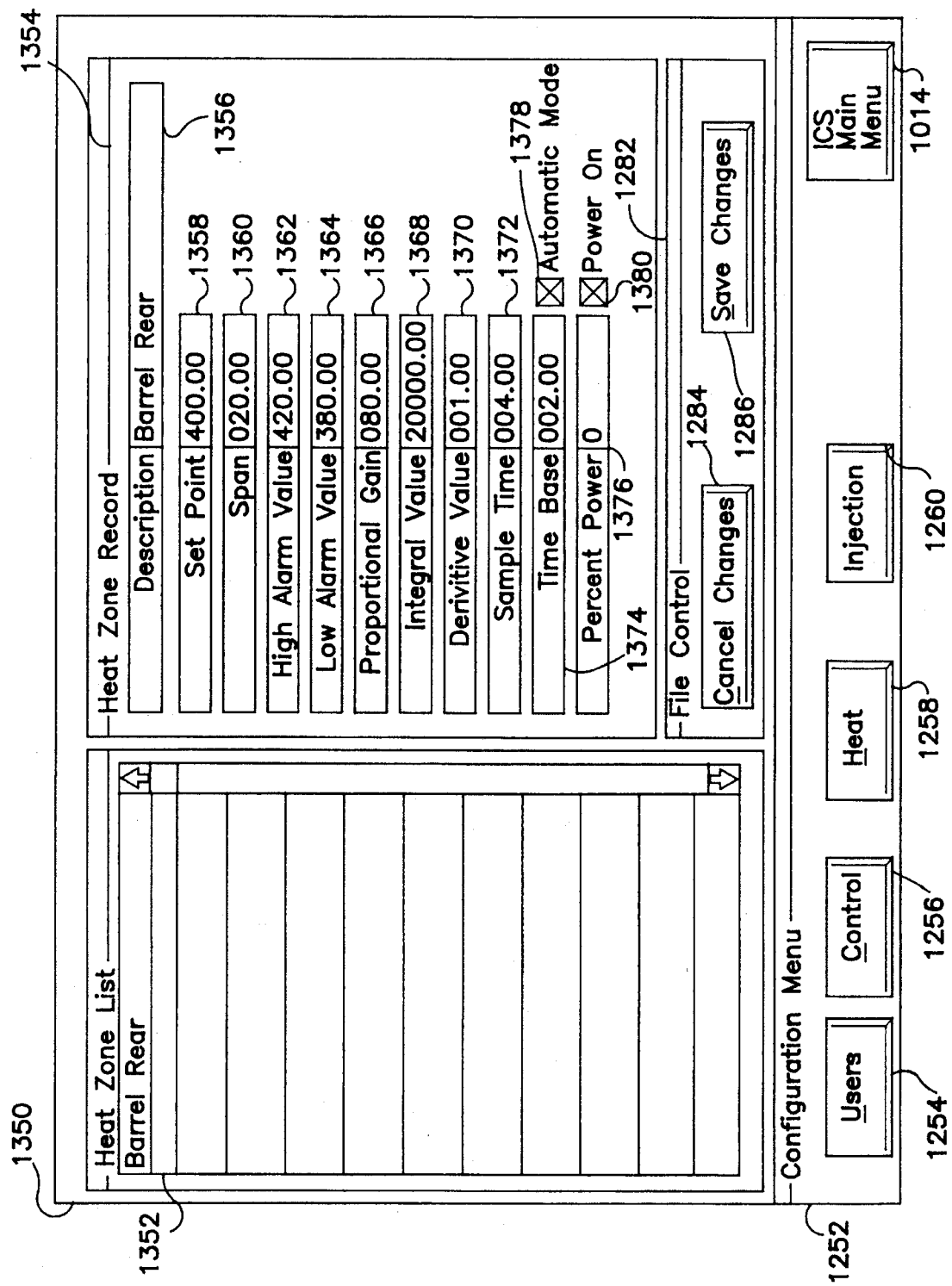
Figure 12:
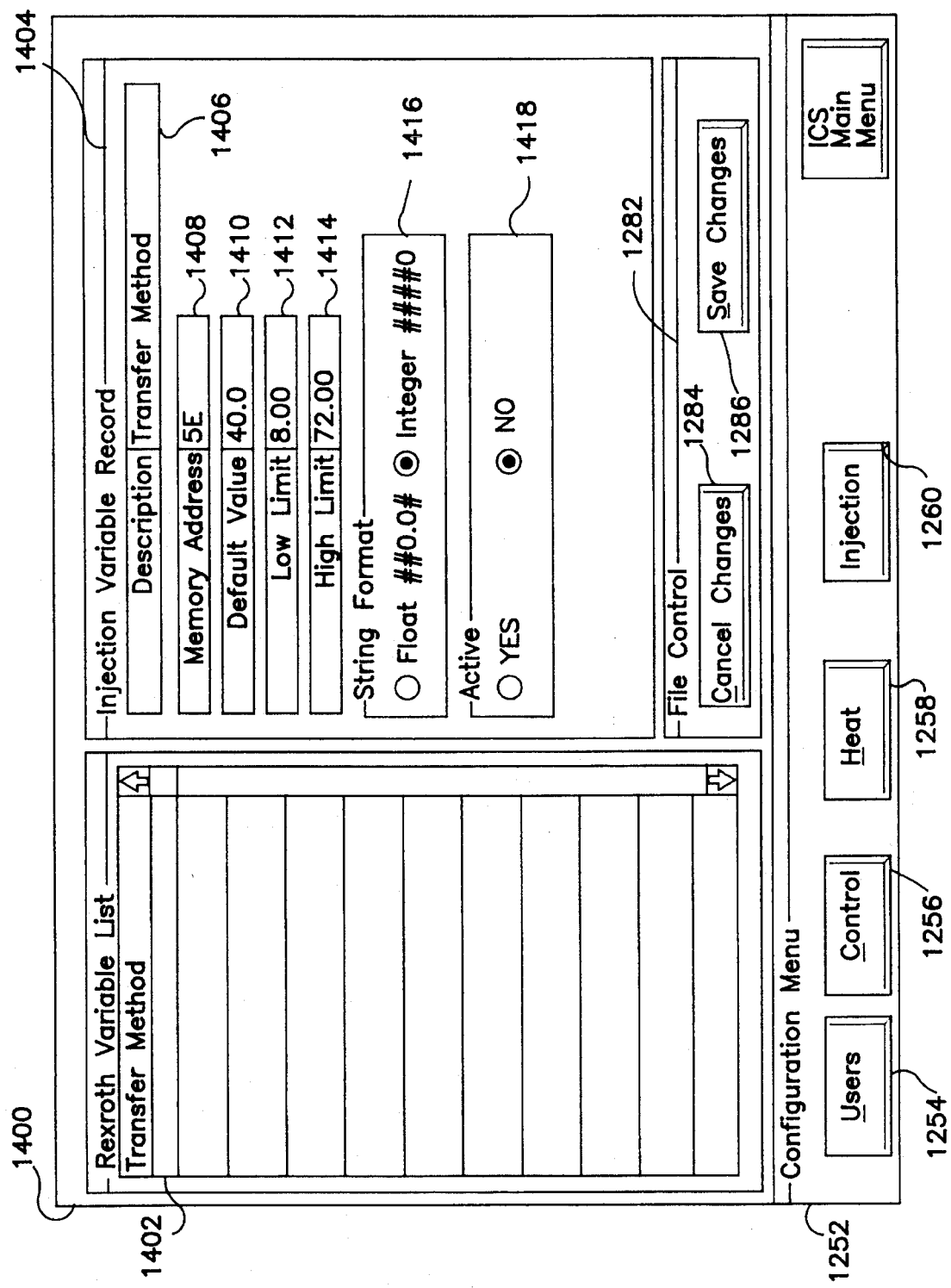

FIG. 8 shows a window which is displayed in response to selection of button 1032. This window provides a central menu for any changes to the configuration of the system. By selecting any one of buttons 1254–1258 in command region 1252, the operator can access a window for controlling a respective aspect of system operation. In particular, the screens shown in FIG. 10–FIG. 12 are used to adjust the blow molding process itself; changes made in these screens are transmitted to the process controller 50. Command region 1252 also includes main menu button 1014, to return to main menu 1000. Command region 1252 is displayed while the operator is viewing the control screens shown in FIG. 9–FIG. 12, as is alarm field 1038.

Figure 9:
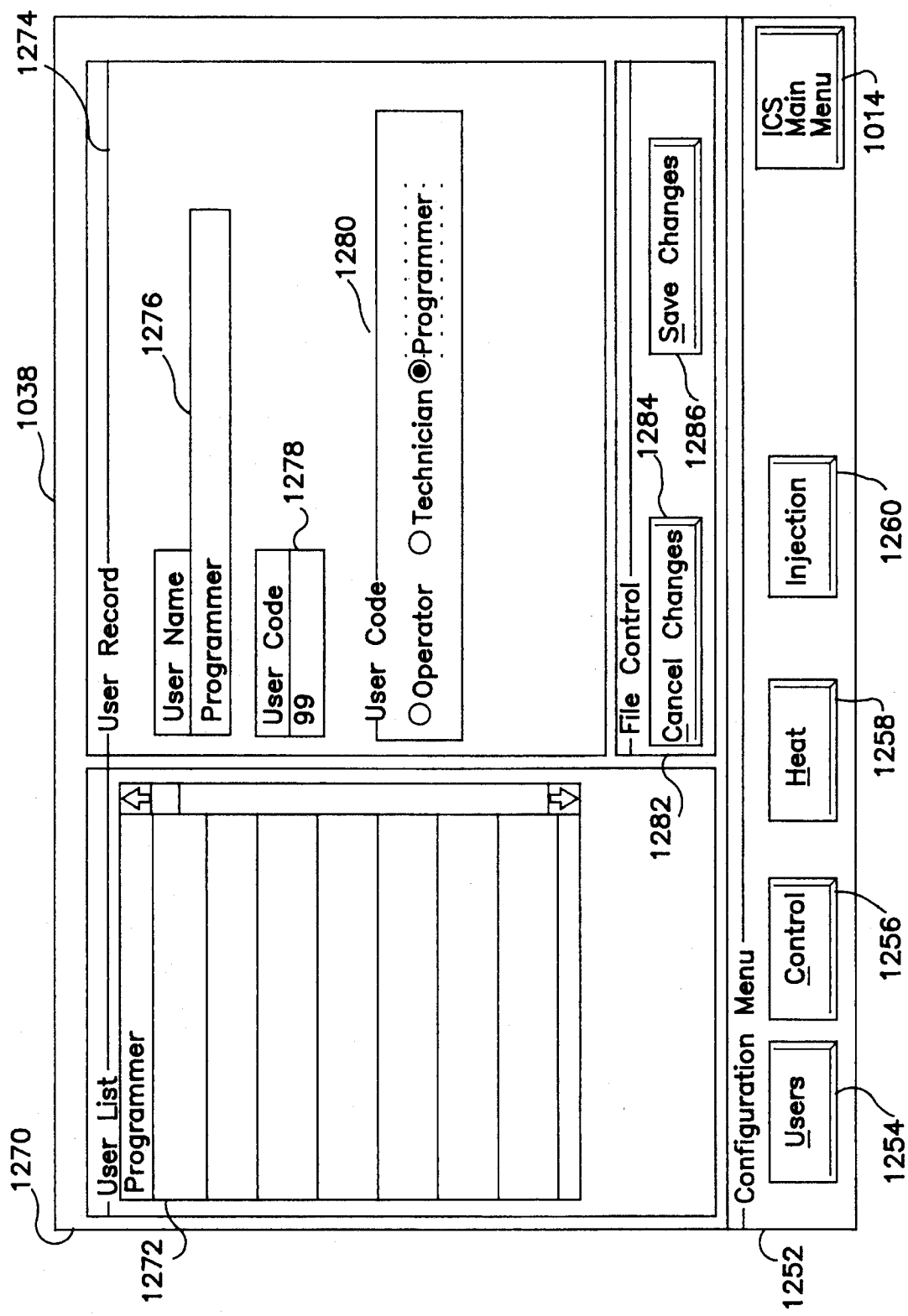

Referring to FIG. 9, there is shown a screen 1270 which is displayed on monitor 70 in response to selection of the USERS button 1254. Because screen 1270 permits changes to the capability levels of all of the user, access to screen 1270 is limited to users who have the highest capability level, i.e., programmers. Screen 1270 also includes a file control field 1282 which includes control buttons 1284 and 1286 to cancel or save changes, to the user database, respectively. The file control field 1282 is also displayed on the screens shown in FIG. 10–FIG. 12.

FIG. 10 shows a control variable adjustment screen 1300 which is displayed in response to selection of command button 1256. List box 1302 lists the names of the control parameters which are controlled and/or monitored by process controller 50. When one of the elements of the list box is selected, the title is displayed in field 1306. The address port used to exchange data with process controller 50 regarding this variable is shown in field 1308. The units, default value, low and high limits, and string format are displayed in respective fields 1310, 1312, 1314, 1316 and 1318. Control variables are activated or deactivated by selecting the appropriate button in field 1320.

FIG. 11 shows a heat zone control screen 1350 which is shown in response to selecting control button 1258. This screen is generally similar to the screen 1300 shown in FIG. 10 (a list box 1352 of parameters, a parameter region 1354 and a file control region 1282), except that a different category of control parameters is shown. All of the parameters listed in list box 1352 are temperatures measured at different points in the apparatus. The parameter region 1354 includes fields 1356 for description, 1358 for set point, 1360 for span (difference between setpoint and alarm limits), 1362 and 1364 for alarm limits, 1366, 1368 and 1370 for PID equation coefficients, 1372 for sample time, 1374 for time base, and 1376 for percent power. There are two on/off switches 1378 and 1380 for automatic mode and power on, respectively.

FIG. 12 shows another control screen 1400 for adjusting control parameter values. The parameters shown on this screen relate to the injection process. As noted above, the processes controlling injection may be controlled by process controller 50, by a separate process controller or by dedicated hardware. In the exemplary embodiment, these functions are under control of process controller 50 and the adjusted parameter values are transmitted to controller 50 as necessary.

Figure 13:
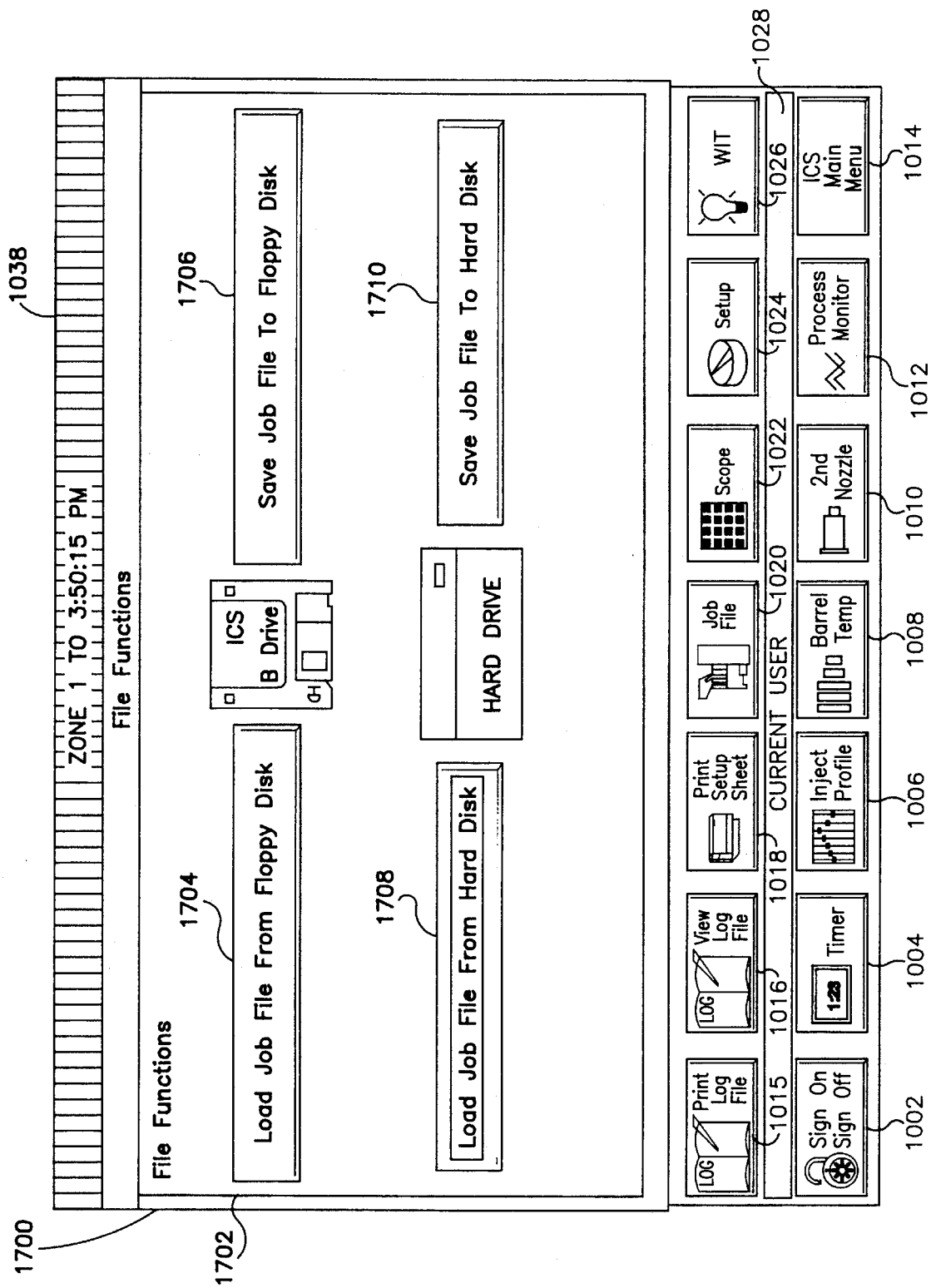
FIG. 13 through FIG. 15 show further operator interface windows for performing utility functions in the apparatus shown in FIG. 1.
Figure 14:
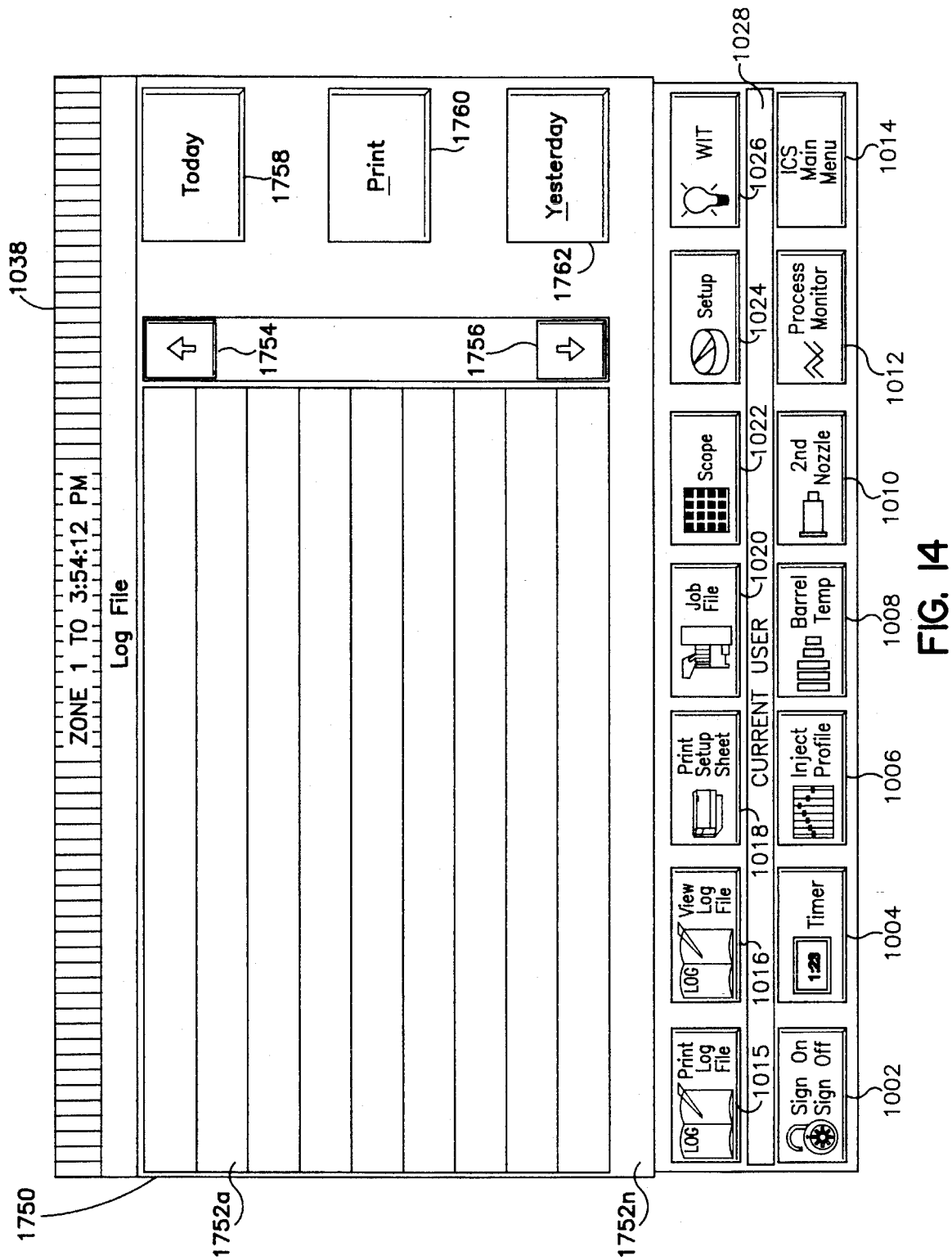
Figure 15:
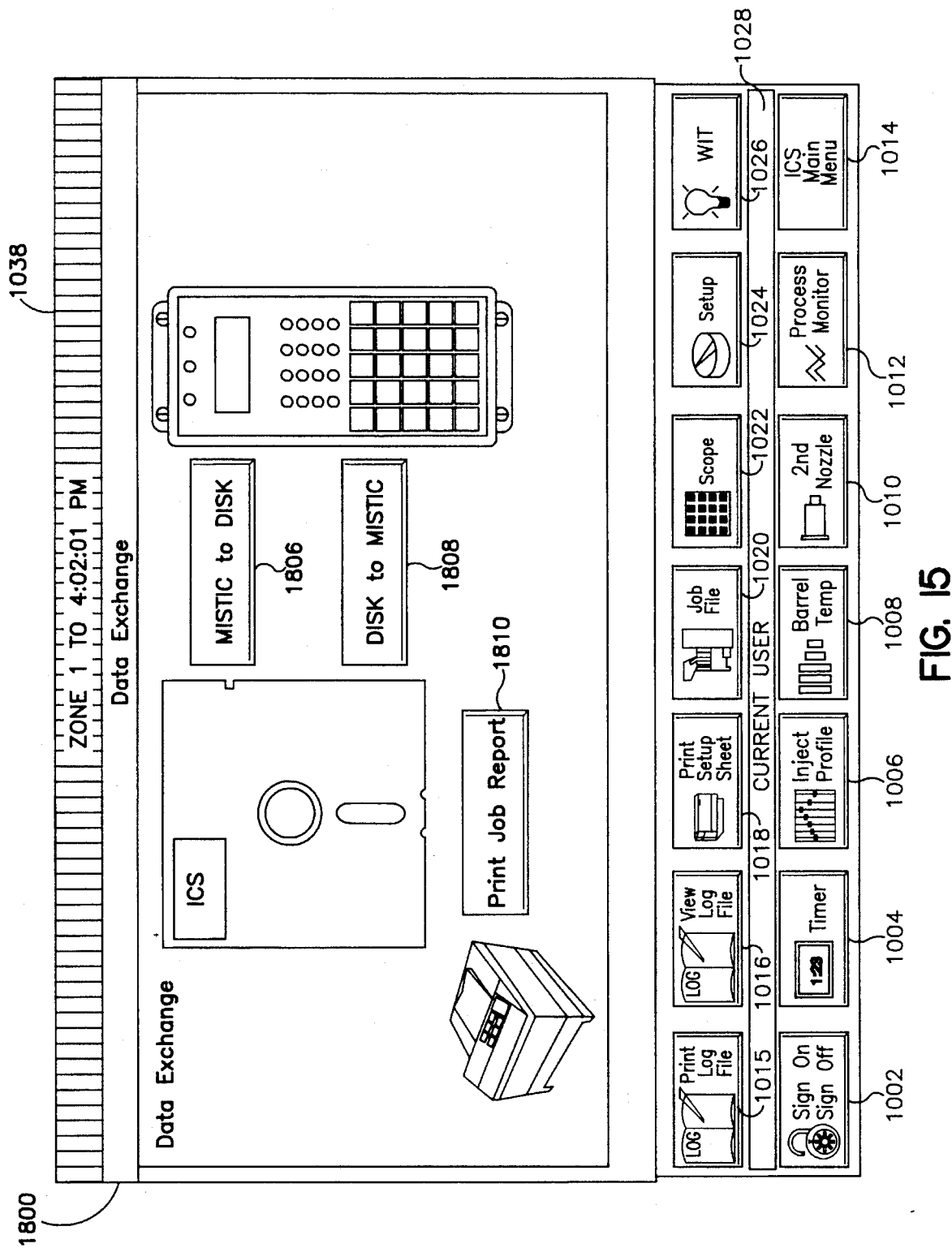

FIG. 13–FIG. 15 show screens which are used by the operator for auxiliary functions not directly related to production of bottles. Menu 1700, shown in FIG. 13, is displayed in response to selection of command button 1020 (shown in FIG. 2), and is used to load/save job files from/to the floppy disk (using buttons 1704 and 1706) or the hard drive (using buttons 1708 and 1710) in processor 60. FIG. 14 shows a log file window which is displayed in response to selection of command button 1016, and is used to display the log of any actions taken by any operator. The user scrolls through entries 1752a–1752n of the log, using scroll buttons 1754 and 1756. The user is also able to select the day for which log data is displayed, using buttons 1758 and 1762. FIG. 15 is displayed in response to selection of button 1034 (shown in FIG. 2), and is used to exchange data between processor 60 and process controller 50, via disk transfer.

Referring again to FIG. 2, additional auxiliary functions are executed from the main menu 1000. Regular reports are scheduled by selecting button 1036. The log file may be printed by selecting button 1014. Print setup information (e.g., desired printer driver) is accessed by selecting button 1018. And a troubleshooting function is executed by selecting button 1026. The troubleshooting function allows the user to walk through a successive list of menus to identify quick fixes for commonly experienced problems.

The capabilities invoked using the controls shown in FIG. 2–FIG. 15 provide a quick and convenient method for monitoring system performance, identifying problems, and implementing adjustments to improve the process. Together with the control programs executed in process controller 50, they form a closed loop control system for the injection blow molding process.

Figure 16:
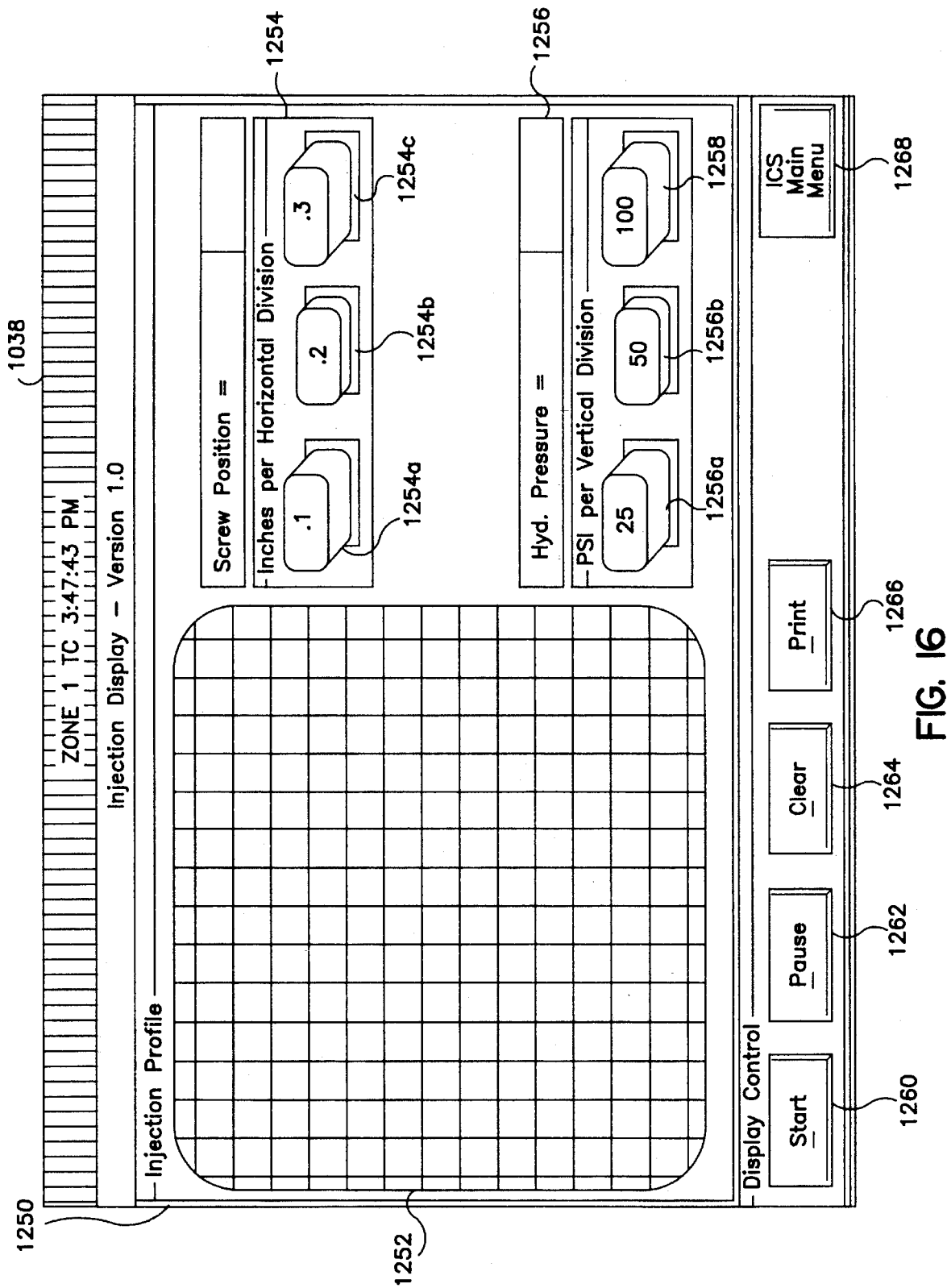
FIG. 16 shows an operator interface window for monitoring injection in the apparatus shown in FIG. 1.

FIG. 16 shows a display which is available to the operator for monitoring the actual injection pressure profile. The pressure profile is displayed on a grid 1252 in "oscilloscope" format, with selectable horizontal and vertical scales. The scales are controlled using respective scale control fields 1254 and 1256. This display is useful in conjunction with the control screen 1130 (shown in FIG. 5) to determine how well the system is responding to the desired profile input using screen 1130.

The process monitor is the second major function within the ICS. The process monitor provides the operator additional tools to observe a variety of processing parameters in a variety of different graphical formats, to identify overall system status at a glance. The process monitor also allows the operator to input a set of "soft alarm limits" which may have a narrower range than the actual "hard" alarm limits which are entered using the configuration windows described above with reference to FIG. 11–FIG. 12. Furthermore, the capability to execute the process monitor may be provided to more personnel than have the capability to execute the operator interface control functions of the ICS. None of the user actions taken or parameters set during execution of the process monitor affect the actual operation of IBM machine 10, or change any control parameters in process controller 50. Therefore, only the lowest capability level is necessary to access the process monitor. The capability to execute the process monitor may be allowed to any user with a valid password without endangering safety. The functions of the process monitor are shown in FIG. 17 through FIG. 25b.

FIG. 17 shows the process monitor window 100 shown on monitor 70 in response to selecting button 1012 from window 1000 or another window. The process monitor display 100 includes three main regions. At the top of display 100 is an alarm field 102 which displays an alarm message. At the bottom of process monitor window 100 is a main menu 340 of icons 312, 314, 316, 318, 320, 322 and 324 in the form of command buttons. Most of window 100 is occupied by a central portion having five regions, each region comprising a plurality of icons, data values, and informational labels and pictures, which are described in detail below. All data are updated periodically at a predetermined number of cycle counts.

Figure 25A:
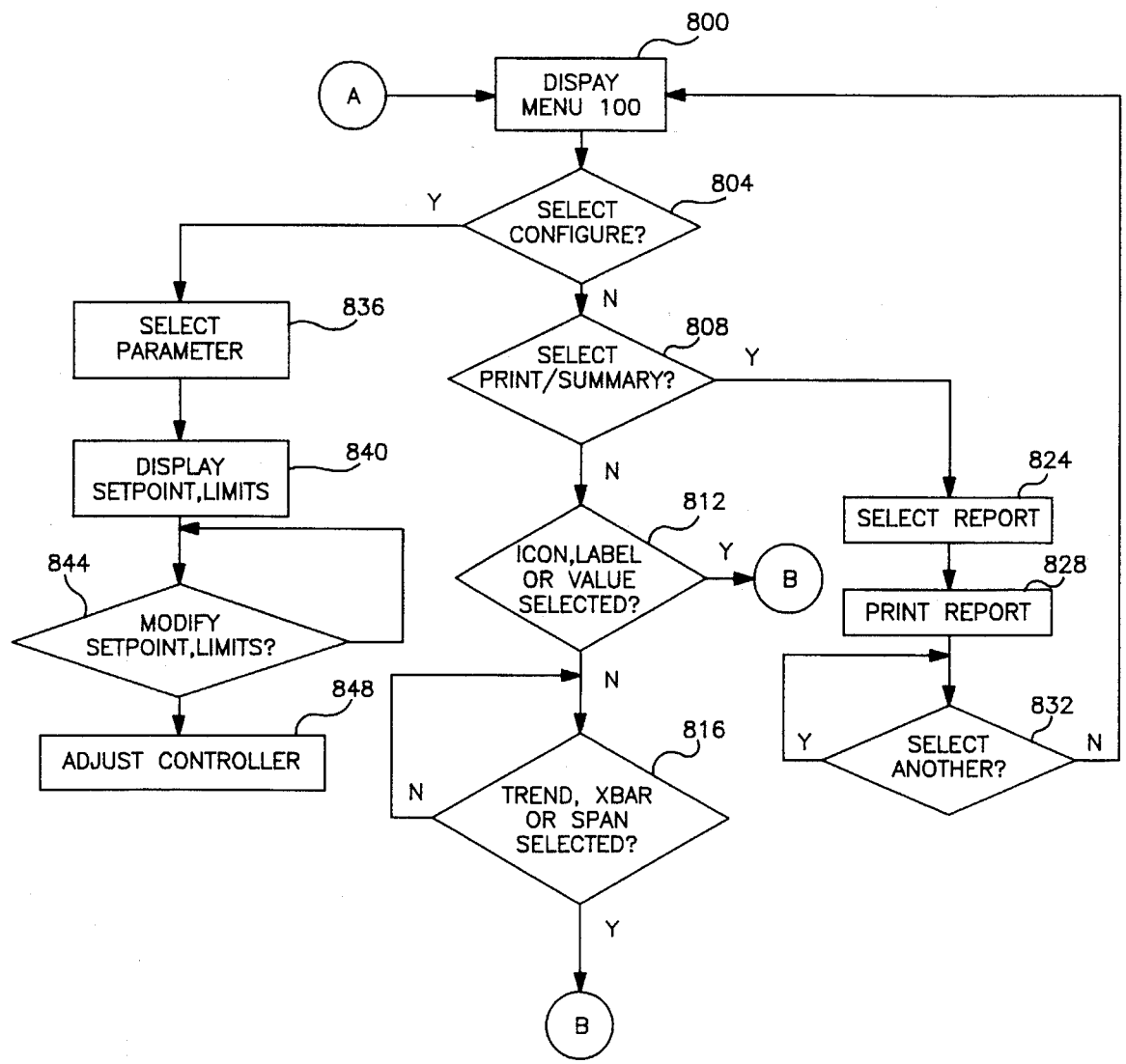
FIG. 25a and FIG. 25b are flow charts of the processes performed by the software operating in the processor shown in FIG. 1.
Figure 25B:
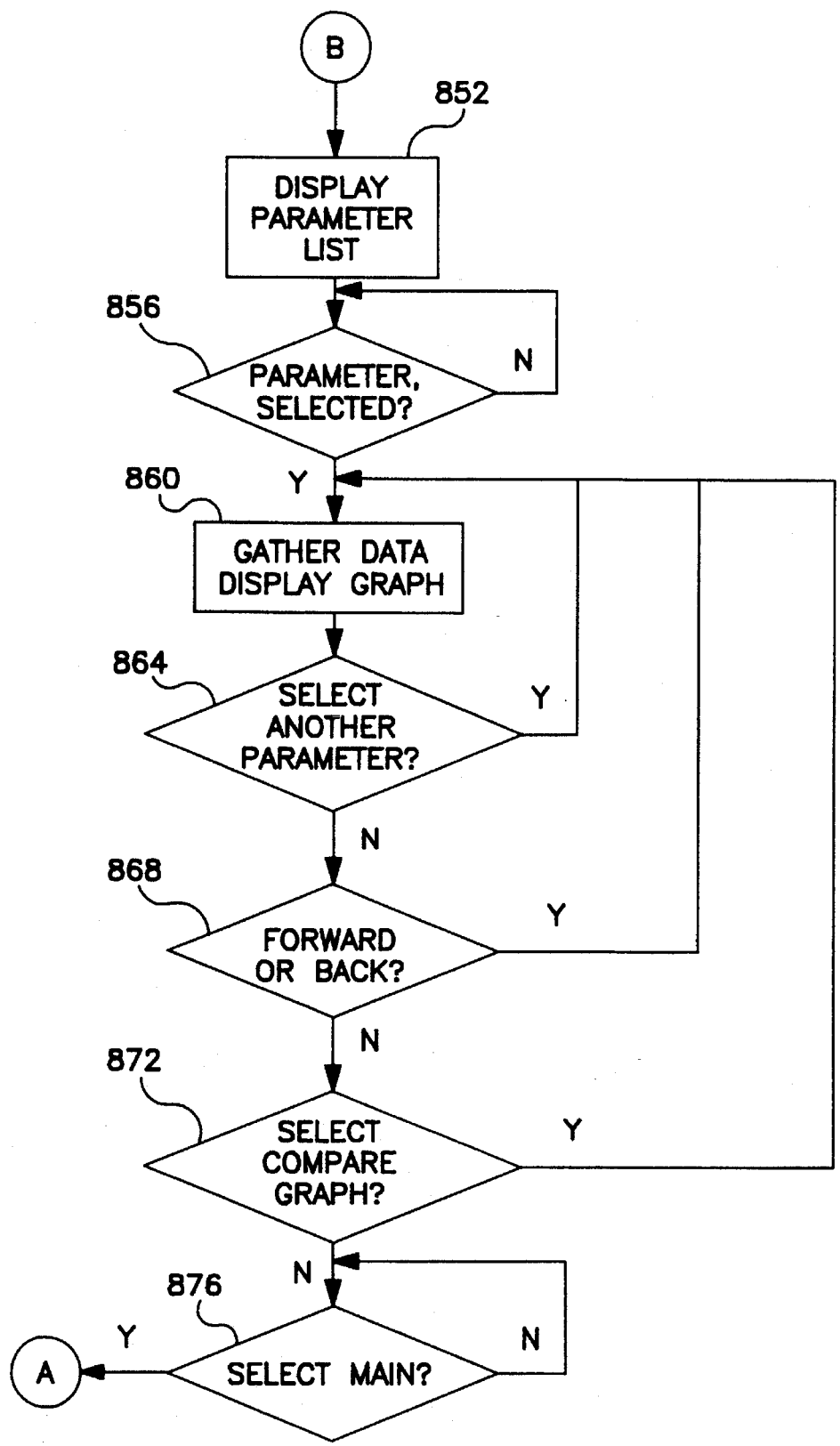

FIG. 25a and FIG. 25b are flow charts which show the general processes performed when the operator interacts with process monitor window 100 shown in FIG. 17. Similarities to the functions performed using the main menu window 1000 (shown in FIG. 2) are also discussed below. Referring first to FIG. 25a, at step 800, a process monitor screen 100 (as shown in FIG. 17) is initially displayed. At step 804, a user with the proper password (capability) level may select a configuration program. If the user selects the configuration program, then at step 836 the user is presented with a menu from which he or she selects the processing parameter for which the soft limits are adjusted. At step 840, the setpoint and the alarm limits for the selected processing parameter are displayed. The setpoints initially displayed are those most recently set using the operator interface program. At step 844, the program waits until the user modifies the setpoint and/or alarm limits.

At step 848, when the user is finished, processor 60 stores the new "reference" setpoint and alarm limit values for use in further process monitoring activity. If the actual setpoints are actually changed using the operator interface program, the "reference" setpoint is not automatically changed to the new setpoint value entered by the operator interface program. If the user re-enters the process monitor and wishes to continue using the old "reference" setpoint and alarm limits, no action is necessary. If, however, the user desires to have the "reference" setpoint and alarm limits match the new actual setpoint and alarm limits, he or she re-enters them manually.

Steps 836 through 848 are similar for a user of the operator interface software described above with reference to FIGS. 2 through 16. The main difference is that at step 848, the operator interface user can actually transmit a new set of setpoint values and/or alarm limits to the process controller 50, using the configuration program menus shown if FIGS. 8 through 11.

At step 808, the user may also select a detailed report or a summary by selecting button 314 or 316. If so, at step 824, the user is presented with a menu to select the type of report, and at step 828, the report is printed. At step 832, the user may select further printed output or return to the process monitor window 100.

At step 812, the user may select a processing parameter by touching an icon, data value display box or a label associated with the desired processing parameter. Alternatively, at step 816, the user may select a command button 318, 320 or 322 at the bottom of process monitor window 100 to select a graph in one of three different formats: a trend graph, a deviation graph or a span graph. These three formats are described below.

Referring now to FIG. 25b, if the user has touched an icon or a command button at either step 812 or 816 above, a list of processing parameters is displayed. At step 856, if the user has touched an icon at step 812, then the processing parameter associated with that icon is preselected. If the user has pressed one of the command buttons 318, 320 or 322 at step 816, then the user must make the selection at step 856. At step 860, once the parameter is selected, processor 60 retrieves the data requested by the user, and displays a graph in the requested format.

At step 864, monitor 70 continues to display the graph until a further operator request is made. The user may select another processing parameter, in which case the newly requested parameter is displayed in the same format is the previously displayed graph. At step 868, the user may touch either the forward or the back command button displayed on monitor 70. Touching the forward button causes monitor 70 to display a graph with the same processing parameter as the first graph, using later collected data. Touching the back button on the touch screen 71 causes monitor 70 to display a graph with the same processing parameter as the first graph, using earlier collected data. At step 872, the user may request a comparison graph. If this option is selected, monitor 70 displays a menu of the processing parameters. The user selects two of the processing parameters, which are then superimposed on a single graph.

At step 876, the user may also touch a button which causes monitor 70 to again display process monitor window 100. The user is then free to select any of the system configuration, report printing and graph displaying steps described above.

For a use authorized to access the operator interface software to control one or the IBM machine 10, the flow is generally as described above for the process monitor, except that the user has access to more menus.

Referring again to FIG. 17, region 330 of window 100 includes icons, temperature displays and identification label 105 for the portions of machine 10 (shown in FIG. 1) associated with storing, feeding and melting the plastic material. Each icon appears as a picture representative of the selected processing parameter associated with the icon. Each icon also includes, adjacent to the picture, a label box in which the name of the processing parameter is displayed. And adjacent to each icon is a value box in which the value of the selected processing parameter associated with each icon is displayed and updated during use. In FIG. 17, the actual values are not shown. Table 1a lists the objects displayed in region 330, and relates them to the apparatus components shown in FIG. 1.

TABLE 1a

Region 330 Icons

| PARAMETER | FIG. 1 REF. NO. | ICON REF. NO. | LABEL REF. NO. | VALUE REF. NO. |
|---|---|---|---|---|
| Dryer | 20 | 110 | 112 | 114 |
| Dew Point Temp. | 20 | 104 | 106 | 108 |
| Barrel Rear | 30 | 116 | 116 | 118 |
| Barrel Mid Rear | 30 | 120 | 120 | 122 |
| Barrel Center | 30 | 124 | 124 | 126 |
| Barrel Front | 30 | 128 | 128 | 130 |
| Nozzle Valve | 34 | 132 | 132 | 134 |
| Nozzle | 34 | 136 | 136 | 138 |
| Manifold | 39 | 140 | 140 | 142 |
| Manifold | 39 | 144 | 144 | 146 |

The icons, labels and value display blocks serve multiple purposes. By looking at the icons and labels, an operator can easily identify the processing parameter. For example, nozzle icon 136 looks like a nozzle. The value display blocks adjacent to the icons provide a continually updated view of the status of the process in the form of text on a background field.

The background fields in the value display blocks are color coded. For any parameter which is within its desired operating range, the background field within the value display box is a first color, which may be green (Green is typically associated with a normal operating condition). The background field has a second color while the value exceeds a maximum value in the desired operating range. Preferably, the second color is red. Since many of the processing parameters are temperatures, the red background provides an instant visual queue that a parameter is too hot (or above the maximum for non-temperature measurands). The background field has a third color while the value is less than a minimum value in the desired operating range. Preferably, the third color is blue, to provide a visual queue that a parameter is too cold (or below the desired minimum for non-temperature measurands).

For example, value display blocks 118, 122, 126, 134, 138, 142 and 146 are shown in FIG. 17 as non-shaded areas, corresponding to the first color. The barrel front value display box 130 has a cross hatched background field (representing the third color). This indicates that the barrel front temperature is below its desired minimum value. Elsewhere on the display, in region 332, the peak hydraulic pressure display value box 196 has vertical cross hatching, representing the second color. This indicates that the peak hydraulic pressure in the injection screw drive system (not shown) is greater than its desired maximum value. The two value display blocks 130 and 196 which indicate alarm conditions match the two processing parameters identified in the alarm message in alarm field 102.

Region 332 includes icons and data for injection processing parameters. The parameters are listed in Table 1b. These parameters measure the effectiveness of the plastic feeding system. For example, given a desired amount of plastic in the shot which is injected into mold 40 (shown in FIG. 1), a desired maximum rebuild time is allowed to move that desired amount of plastic to the forward end of injection screw 32 (shown in FIG. 1). If the rebuild time 156 is observed to grow while the screw speed 202 remains constant, then the raw plastic may not be moving from dryer 20 to barrel 30 (shown in FIG. 1) at the desired rate.

TABLE 1b

Region 332 Icons

| PARAMETER | FIG. 1 REF. NO. | ICON REF. NO. | LABEL REF. NO. | VALUE REF. NO. |
|---|---|---|---|---|
| Rebuild Time | 32 | 152 | 154 | 156 |
| Injection Delay | 32 | 158 | 160 | 162 |
| Cushion Position | 32 | 164 | 166 | 168 |
| Shot Size | 32 | 170 | 172 | 174 |
| Pack Pressure | 32 | 176 | 178 | 180 |
| Rebuild Pressure | 32 | 182 | 184 | 190 |
| Peak Hydraulic Pres. | 32 | 192 | 194 | 196 |
| Screw Speed | 32 | 198 | 200 | 202 |

Regions 336 and 338 show processing parameters for injection (parison) mold 40 and blow mold 44, respectively (shown in FIG. 1). Regions 236 displays the delays for closing (delay 236), filling (delay 242) and packing (delay 248) mold 40, and temperatures at the neck (value 256), center (value 262) and nozzle (value 268) of the parisons. Label 230 and picture 250 identify region 336 as having data pertaining to injection mold 40. Region 238 displays the delays for closing mold 44 (delay 276) and blowing (delays 282 and 288) the containers. Also displayed, are blow mold temperature 296, core rod temperature 302, and blow air pressures 308 and 314. Label 270 and picture 290 readily identify region 338 as having data pertaining to blow mold 44. Table 1c lists the icons, labels and values in regions 336 and 338.

TABLE 1c

Region 336 and 338 Icons

| PARAMETER | FIG. 1 REF. NO. | ICON REF. NO. | LABEL REF. NO. | VALUE REF. NO. |
|---|---|---|---|---|
| Mold Close Delay | 40 | 232 | 234 | 236 |
| Mold Fill Time | 40 | 238 | 240 | 242 |
| Mold Pack Time | 40 | 244 | 246 | 248 |
| Parison Neck Temp. | 40 | 252 | 254 | 256 |
| Parison Center Temp. | 40 | 258 | 260 | 262 |
| Parison Nozzle Temp. | 40 | 264 | 266 | 268 |
| Mold Close Delay | 44 | 272 | 274 | 276 |
| Blow Time #1 | 44 | 278 | 280 | 282 |
| Blow Time #2 | 44 | 284 | 286 | 288 |
| Mold Temp. | 44 | 292 | 294 | 296 |
| Core Rod Temp. | 44 | 298 | 300 | 302 |
| Blow Air Pressure #1 | 44 | 304 | 306 | 308 |
| Blow Air Pressure #2 | 44 | 310 | 312 | 314 |

An additional region 334 includes further processing parameters which are useful in monitoring the container manufacturing process. The index time 208 is the time required to rotate the turret 42 (shown in FIG. 1) to advance parisons between work stations. Also displayed are respective melt, oil and ambient air temperatures 216, 222, and 228, with their associated icons and labels.

The last parameter display region is field 342 which displays a message listing the cycle time and the time at which the last record was filed. The cycle time is the time required between successive injection operations.

The icons in the process monitor display 100 shown in FIG. 17 do more than just show the current status of the processing parameters. As noted above, an icon is a symbol on a screen 100 that a user can select to initiate or reactivate a particular operation. In the present invention, when any one of the process parameter icons in regions 330, 332, 334, 336 or 338 is selected, a graphing program is executed. This program provides graphing means for transmitting signals which cause monitor 70 to show a graph of the selected processing parameter value. The processing parameter is plotted as a function of time in response to an operator touching a portion of the touch screen 71 beneath which the icon is shown on monitor 70. This graph is discussed in detail in the discussion of FIG. 20, below.

It is understood by those skilled in the art that many variations of the icons shown in FIG. 17 may be employed to allow monitoring of additional processing parameters, or to best represent the hardware configuration of a different type of IBM machine.

In the exemplary embodiment of the invention, the alarm field 102 is the same as alarm field 1038; the remainder of process monitor screen 100 is overlaid onto the operator interface displays so as not to cover the alarm message. In an alternative embodiment, in which the process monitor is run as a standalone monitoring system without the operator interface software, the alarm field may be implemented as a separate field.

Alarm field 102 displays alarm messages against a background field similar to the process parameter data value box backgrounds: Processor 60 includes hardware and software which form alarm means, transmitting to the monitor 70 signals which cause the alarm message to be displayed as text on a background field. The background field has a first color (Preferably green) while each respective processing parameter value is within its respective desired operating range. The background field has a second color (Preferably red) while any one of the processing parameter values exceeds a maximum value in the desired operating range. The background field has a third color (Preferably blue) while any one of the processing parameter values is less than a minimum value in the desired operating range.

As shown in FIG. 17, it is common for two parameters to be outside of their desired ranges, with one parameter above its high alarm limit, and the other parameter below its low alarm limit. In the exemplary embodiment, the background field is then set to the second color (e.g., red). A variation (not shown) of the exemplary embodiment includes a different background field when both high and low alarm limits are exceeded. This may be a fourth color or a pattern.

Another aspect of the present invention is the particular use of windowing software for an industrial environment. Conventional GUIs allow the user to modify the window size and shape, to shrink the window to an icon, and to hide a window. These options are undesirable in an industrial control application. In accordance with the present invention, the display means include means for displaying a control panel within a window on the monitor 70 (e.g., the process monitor window 100 shown in FIG. 17, which includes icons, labels and processing parameter values). The alarm means include means for displaying the alarm field 102 within the same process monitor window 100 as the control panel. Process monitor window 100 is sized to fill the monitor 70. The user is effectively preventing from modifying the size or shape of this window, and from hiding the window.

The method of accomplishing this depends on the windowing software used. In the exemplary embodiment, using Microsoft Windows™, this is accomplished by setting the minimize button (used to shrink the window into an application icon) to "false". The maximize button (used to enlarge the window to fill the screen) is set to "true". The control menu box (used to pull down an application control menu) is set to "false". The title bar (which displays the application or window title) is set to a null string. The border style property is set to "1" for "fixed single" or to "3" for "fixed double". The window is maximized so that it occupies the entire monitor 70. It is understood by one skilled in the art that the window size could be altered using a keyboard. To prevent inadvertent modification, processor 60 is not equipped with a keyboard, thereby preventing tampering by the IBM machine operator.

Figure 18:
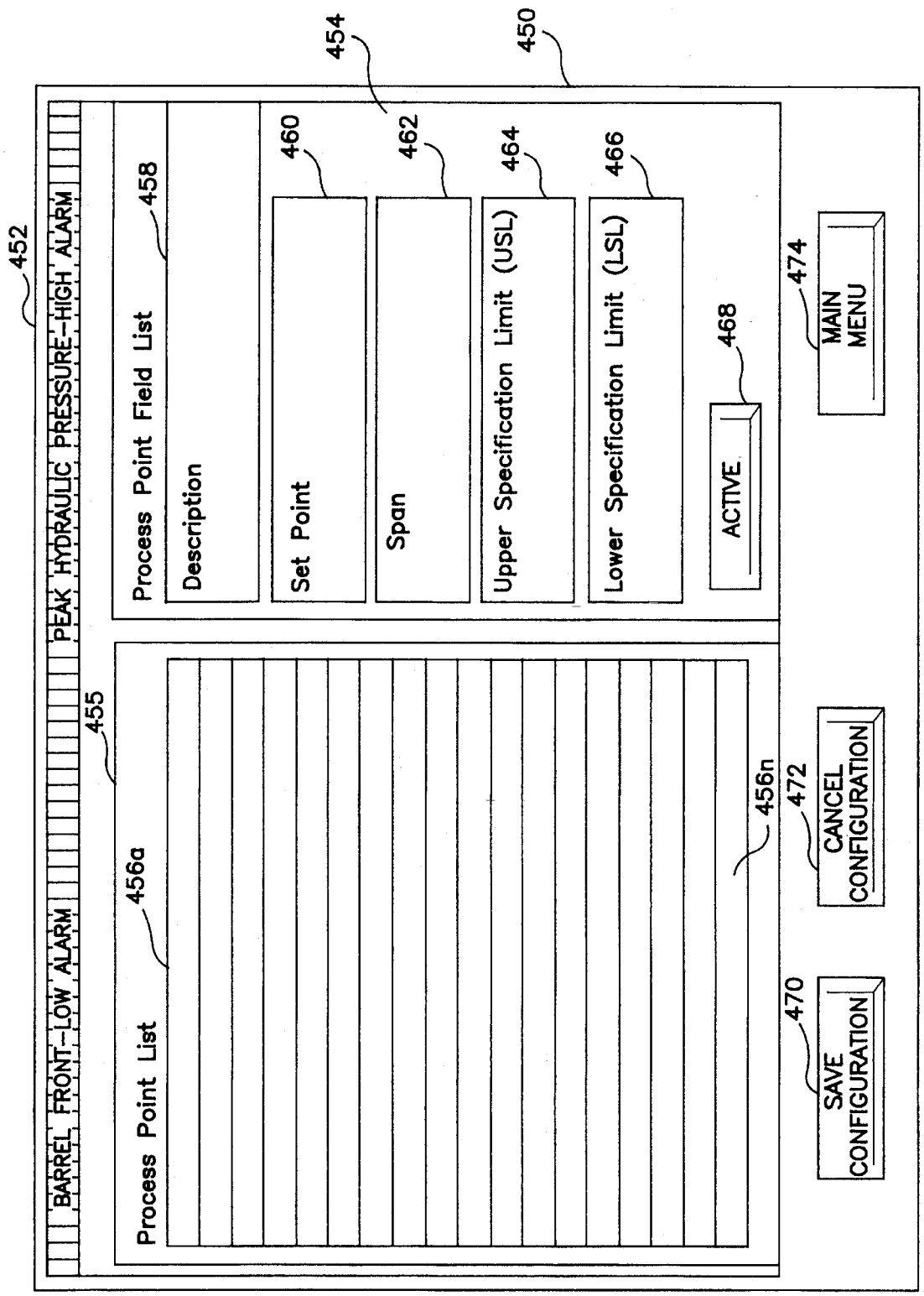
FIG. 18 shows an additional sub-menu window used in the apparatus shown in FIG. 1.

At the bottom of screen 100 is a region of buttons (icons) for initiating further routines and processes. If the configuration command button 312 (the leftmost button) is selected, then window 450, as shown in FIG. 18 is displayed in response to selecting button 312. Referring now to FIG. 18, there is shown a window 450 for adjusting process parameter set points and alarm limits used within the process monitor for graphs and alarms. At the top of window 450 is an alarm field 452 which displays an alarm message. The alarm message and the background in field 452 are the same as in alarm field 102 of screen 100. In fact, the alarm message is continuously displayed regardless of which commands are executed or which window is displayed. The message and background color do not depend on the window currently displayed; they only depend on the current alarm limits and processing parameter values.

The advantage of alarm field 452 is now apparent. In accordance with the invention, for all windows displayed by the display means, the operator is apprised of any alarm condition regardless of what is displayed on the rest of monitor 70. Once alerted in this manner, the operator can obtain a more detailed view of the out of range condition by selecting main menu button 474 and returning to screen 100 (as shown in FIG. 1). As described above for window 100, window 450 is configured to prevent an operator from accidentally changing the size or shape of window 450, and from hiding window 450. In accordance with the invention, these actions cannot be initiated using the touch screen 71, but only by way of keyboard 72.

At the left side of window 450 is a process point list box 455. List box 455 includes a plurality of process parameter names 456a–n which correspond to the process parameters displayed in FIG. 17. It is understood by those skilled in the art that a list box may be constructed with conventional windowing software to display a menu in list form. The user may scroll forwards and backwards in list box 455, till the parameter is displayed for which the user desires to adjust the set point or alarm limits used within the process monitor.

Once the process parameter is selected, the title of the selected processing parameter is displayed in field 458, the set point in field 460, the upper and lower alarm limits (i.e., the maximum and minimum desired values) in respective fields 464 and 466, and the span 462 (which is the automatic adjustment of the upper specification limit 464 and the lower specification limit 466 when the setpoint 460 is changed). The user may change the alarm limit by selecting set point field 460 and typing in a new value on keyboard 72 (shown in FIG. 1). The user may also change the span between the alarm limits by selecting span field 462 and typing in a new value. The program will automatically adjust the high and low alarm limits so that they differ by the new span value shown in field 462, and so that the set point is midway between the alarm limits. Alternatively, the user can set the high and low alarm limits directly. When the user is satisfied with the new setpoint and alarm limits, he or she can save them by selecting the save configuration command button 470. The updated setpoint and alarm limits are then used for further graphs and alarm messages within the process monitor. Alternatively, if the values are incorrect, they can be canceled by selecting button 472, and the original setpoint and alarm limits are retained. When the user is finished adjusting input parameters, main menu command button 474 is selected, returning the user to process monitor window 100.

The process monitor described above may be used to monitor processing parameters which are not under control of process controller 50. For example, in some configurations, auxiliary support equipment may be furnished with its own dedicated process controller (e.g., the thermolators and chillers that control the temperature of the molds). This equipment is not configured using the operator interface software described above with respect to FIG. 2 through FIG. 12. Nonetheless, the temperature parameters controlled by this equipment may be monitored and displayed in process monitor window 100, shown in FIG. 17.

Referring again to process monitor screen 100 (shown in FIG. 1), by selecting either button 314 or 316, the user causes the printout of a report summarizing the processing parameter data for the day on which the selection is made. By selecting button 318, 320 or 322 further windows are displayed.

Figure 19:
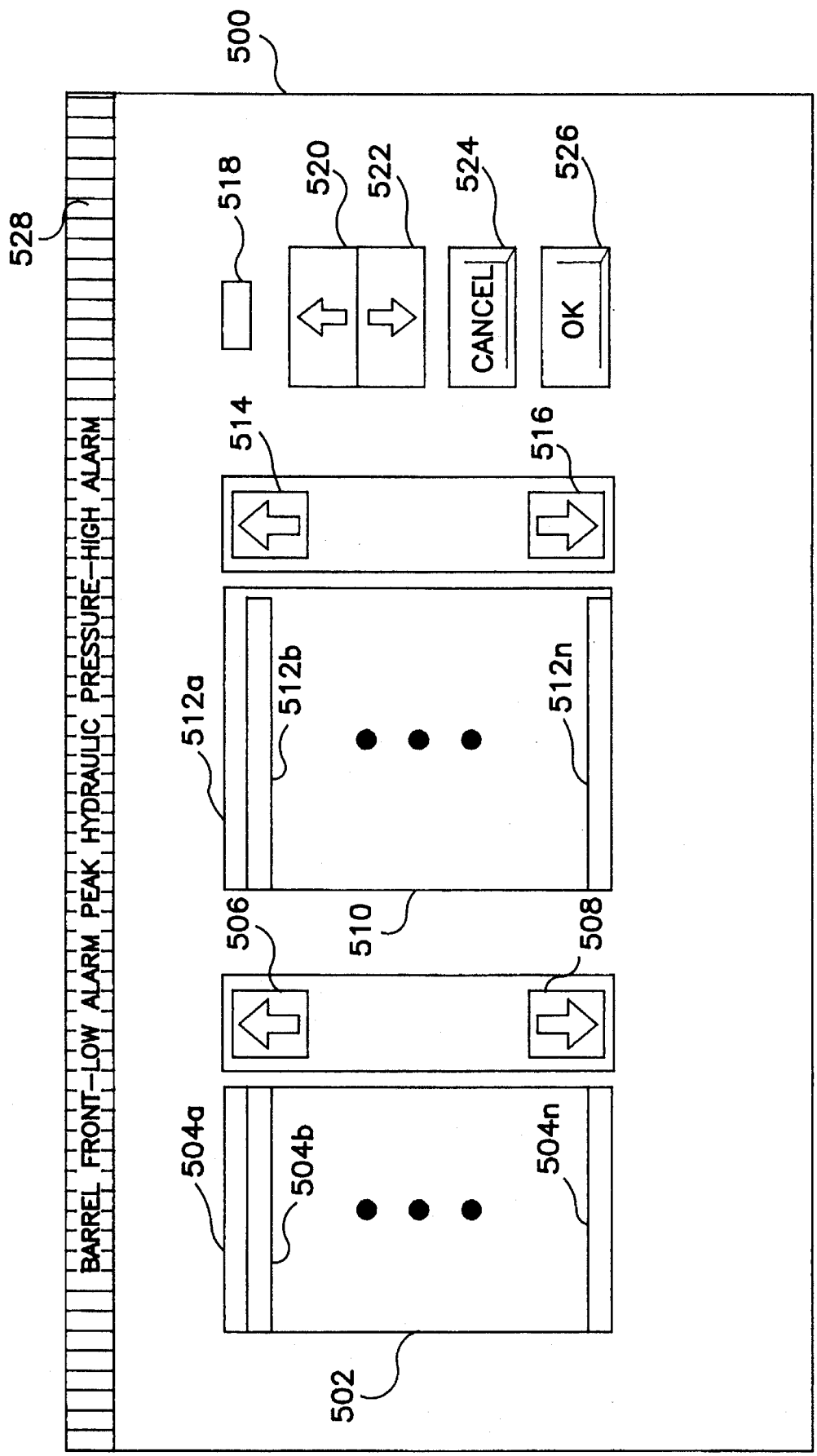
FIG. 19 shows an additional sub-menu window used in the apparatus shown in FIG. 1.

If Trend Graph button 318 is selected, window 500, as shown in FIG. 19, is displayed. At the top of window 500 is alarm field 528 for displaying an alarm message. A list box 502 lists data files 504a–n which may be graphed. A new data file 504i is automatically created daily, and each data file available 504a–n is listed. The user can scroll forward or backward through the list by touching respective arrow buttons 508 or 506. A second list box 510 lists all of the processing parameters 512a–n which may be graphed. The user can also scroll through list box 510 using arrow buttons 514 and 516.

A numerical field 518 allows the user to select the number of subgroups to display on the graph. A subgroup is a set of currently compiled data from a selected number of consecutive machine cycles. A typical subgroup may include data from six machine cycles. The data within a subgroup are thus collected within a contiguous time interval. The system determines a minimum value, a maximum value and an average value for each respective processing parameter monitored by the system. The user adjusts the number of subgroups by pressing respective up and down arrows 520 and 522. The number of subgroups displayed in field 518 is the number of subgroups for which data are displayed in the graph. For example, if the user selects 100 subgroups by entering "100" in field 518, data from 100 subgroups are displayed. Each subgroup corresponds to an interval of time, and includes data points collected during that interval.

Once the desired graph is defined, the user presses the OK button 526. If window 500 has not been filled out correctly, the user can select the cancel button 524 instead. As described above for process monitor window 100, window 500 is configured to prevent an operator from changing the size or shape of window 500, and from hiding window 500.

The invention also provides a quicker alternative selection method. Graph selection may be made while screen 100 is displayed, by touching any one of the following: the icon (e.g., thermometer picture 110), its label (e.g., the "Dryer Temperature" label 112) or the data value box (e.g., box 114) in one of regions 330, 332, 334, 336 or 338. When window 500 is displayed, the processing parameter associated with the icon touched by the user is already selected. The current day and number of subgroups are also selected. The user need only touch the OK button 526 to display the graph. The user may optionally change the file selection (e.g., to view data from a previous day) or the number of subgroups before touching the OK button 526. A graph of the selected processing parameter is then displayed using the current number of subgroups and the data collected during the current day.

Figure 20:
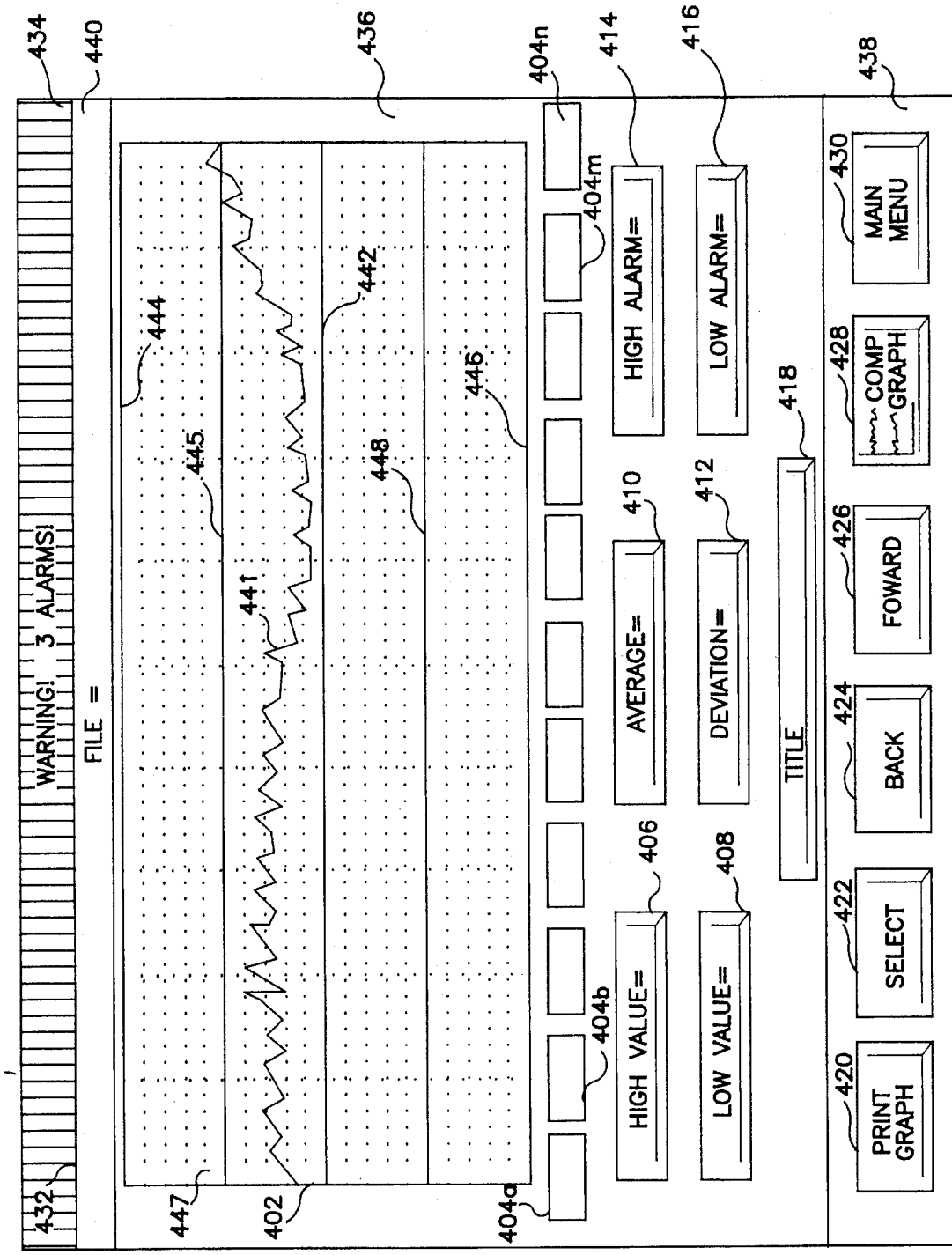
FIG. 20 shows a graph displayed by the apparatus shown in FIG. 1.

FIG. 20 shows a further window 400 which is displayed in response to selection of one of the processing parameter icons in regions 330, 332, 334, 336 or 338 of display 100. Like screen 100, screen 400 includes three main regions. The top region is an alarm field 434 for displaying the alarm message. The center region 436 includes a graph 402 and numerical displays 406, 408, 410, 412, 414, and 416 of statistical measures of the parameters in the graph. Time coordinates 404a–n are displayed along the ordinate of graph 402. The bottom region 438 of window 400 includes a plurality of buttons for selecting further programs or actions. The screen 400 also includes a title field 418 for the label of the selected processing parameter plotted on graph 402, and a file identification field 440, for identifying the data file from which the data were retrieved. As described above for window 100, window 400 is configured to prevent an operator from changing the size or shape of window 400, or from hiding window 400.

The alarm message displayed in field 434 is the same as the message displayed in field 102 of screen 100. An alarm message is displayed continuously. Because the process monitor program data acquisition process runs in real time, the alarm message may change at any moment. Alarm field 434 is shown after a change in the error message. The alarm message indicates that there are three alarms. Because of the limited size of the text field in alarm field 434, the labels of the processing parameters are not all printed in a single field if more than two processing parameters are outside of their desired operating ranges. The change in the message from two alarms to three alarms alerts the operator that he or she should return to the main menu window 100 to determine the cause of the new alarm message.

An alternative for the alarm display used while multiple parameters exceed their alarm limits is to display each alarm in succession at a predetermined interval (e.g., one second intervals). After the last out-of-range condition is displayed, the alarm message "wraps around" and again displays the first out-of-range condition. This has the advantage that each alarm condition is individually displayed, and in the event that a high alarm limit and a low alarm limit are exceeded simultaneously, each alarm message is displayed with the appropriate background color (i.e., red for high and blue for low).

Still another alternative solution to display of multiple alarm messages is to provide a larger number of labels, by using a smaller character size or a larger alarm message field 434.

Graph 436 includes a single curve 441 of data points for the selected processing parameter. There is one point in curve 441 for each subgroup. Each data point in curve 441 represents the average of all of the values for the selected parameter collected during the interval corresponding to the subgroup (except for the span graph, which uses the minimum and maximum subgroup values). The graphing means which form window 400 include means for retrieving from storage a set of data values for the selected processing parameter. The storage may be on a local disc. The data values are assigned to a plurality of subgroups, as describe above, each respective subgroup having data values collected by the process controller during an interval of time. For each subgroup, an average value of time is calculated for the interval during which the data in the subgroup are collected.

Graph 436 has a horizontal line 442 at its center, corresponding to the set point value along the abscissa. The upper graph boundary 444 and the lower graph boundary 446 are automatically determined so that the range of values along the abscissa is twice the desired operating range between the high alarm limit and the low alarm limit. Another horizontal line 445 is displayed at the high alarm limit. A region 447 of the graph between the high alarm limit line 445 and the top of the graph 444 may have its color set to the second color (Preferably red) if the selected processing parameter exceeds its high alarm limit at any time during the time period for which data is plotted in order to clearly indicate at which points in time the alarm limit is exceeded. A further horizontal line 448 is displayed at the low alarm limit, and the bottom region of the graph may have its color set to the third color (Preferably blue) to indicate which points are below the low alarm limit.

The graphing means which form screen 400 include means for transmitting signals which cause the monitor 70 to show a forward command button 426 and a backward command button 424. The range of time coordinates displayed in graph 402 is changed in response to an operator touching (one of the portions of touch screen 71 above) the forward command button 426 and the backward command button 424. When either of buttons 426 or 424 is selected, the data curve 441 is replotted for a different set of time coordinates. If button 426 is selected, the earliest time 404a for which data are shown after replotting is approximately equal to the next-to-latest time 404m for which data are shown before replotting. This provides an overlap in time coverage between the curves 441 shown before and after selecting button 426. Similarly, when the operator selects button 424, the latest time 404n for which data are shown after replotting is approximately equal to the next-to-earliest time 404b for which data are shown before replotting.

Window 400 also includes a select button 422, used to select a further processing parameter, for which a graph is desired. If this button is selected, then the processing parameter selection window 500 of FIG. 19 is again displayed, and the user selects the further processing parameter in the manner described above with reference to FIG. 19.

Referring again to FIG. 20, the graphing means which form screen 400 include means for transmitting signals which cause the monitor 70 to display window 400. The graphing means also cause display of a comparison graph command button 428. Selecting button 428 allows the operator to view the data values of two processing parameters side by side on a single graph.

Figure 21:
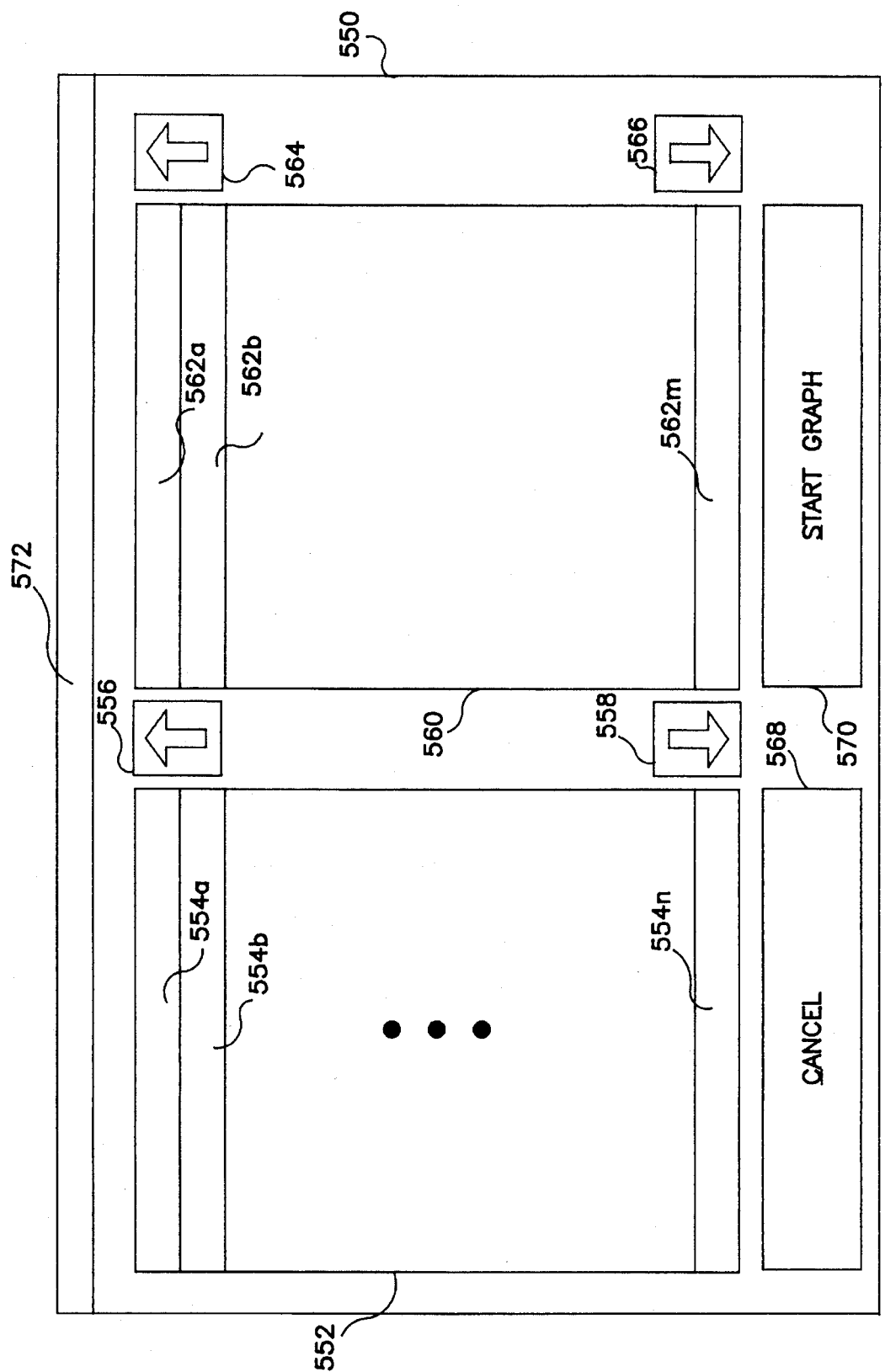
FIG. 21 shows an additional menu window used in the apparatus shown in FIG. 1.

FIG. 21 shows the comparison graph selection window 550 displayed in response to an operator selecting button 428. Window 550 includes an alarm field 572 similar to alarm field 102 in FIG. 1. Window 550 also includes two identical list boxes 552 and 560, which are similar to list box 510 as shown in FIG. 19. List boxes 552 and 560 include respective menu lists 554a–n and 562a–n defining all of the processing parameters which may be plotted. The operator may scroll forward in list boxes 552 and 560 by touching the respective down buttons 558 and 566. The operator may scroll backward in list boxes 552 and 560 by touching the respective up buttons 556 and 564. Once the two desired parameters are selected, the operator touches the start button 570 to plot the graph. As described above for window 100, window 550 is configured to prevent an operator from changing the size or shape of window 550, and from hiding window 550.

When start button 570 is touched, window 400 is again displayed, except that single curve 441 is replaced by two curves (not shown). Also, the standard deviation field 412, high alarm field 414 and low alarm field 416 are replaced by high value, low value and average value fields (not shown) for the second processing parameter. Preferably, the two curves have different colors, and the title field 418 displays the label of each of the two processing parameters and the color in which each is plotted.

Referring again to FIG. 17, a command button 320 is displayed in the process monitor window 100. Selecting command button 320 causes display of the processing parameter selection window 500 of FIG. 19. When a processing parameter is selected, a standard X Bar and R chart (not shown) is displayed similar to graph 402 as shown in FIG. 20, except that the graph is split into top and bottom halves. The top half of the graph includes a curve similar to curve 441, of the process parameter values. The bottom half of the graph includes a curve plotting the maximum deviation of individual measurements within the subgroup from the setpoint (only a single average value is plotted for the whole subgroup). All deviations, whether positive or negative are shown as positive values in the bottom (deviation) curve.

Figure 22:
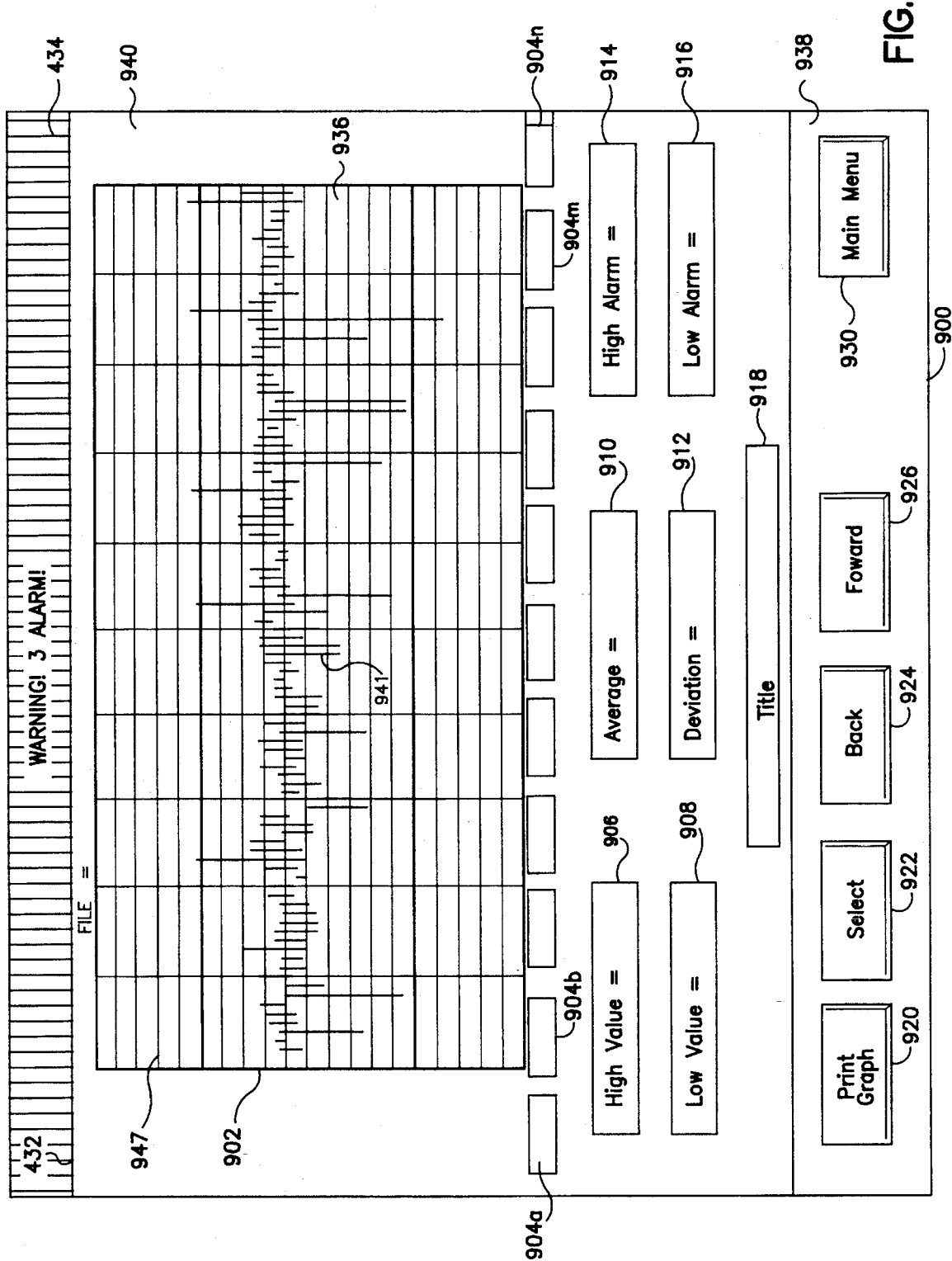
FIG. 22 shows an additional graph displayed by the apparatus shown in FIG. 1.

Also shown in FIG. 17 is a span graph command button 322. Touching the span graph button also causes display of the processing parameter selection window 500 of FIG. 19. After selecting button 322, when a processing parameter is selected from window 500, a span graph is displayed as shown in FIG. 22. Referring to FIG. 22, a display window 900 similar to window 400 is shown. The span graph window 900 has two distinguishing features. Instead of a single curve 441 as shown in FIG. 17, there is a set of lines 941, each line extending between the minimum and maximum parameter values measured during a respective subgroup. The subgroup includes data from a time interval which includes multiple machine cycles. The other difference between window 400 and window 900 is that window 900 has no comparison graph command button 428.

The span graph 941 is displayed by the graphing means described above with reference to FIG. 20. In addition to the functions described above for plotting the trend graph, the graphing means include means for selecting a respective minimum value from each of the subgroups and a respective maximum value from each of the subgroups, for each subgroup. To form the span graph, a vertical line segment is displayed for each subgroup. The line segment extends from the lowest value of the processing parameter measured during the interval to the highest value measured during the interval. The line segment has a time coordinate equal to the time the subgroup was previously written to a file on a disk or other known storage medium. Thus, the graphing means include means for generating signals which cause the monitor 70 to display a line segment extending from the minimum value to the maximum value. The graph includes one such line segment for each subgroup. The span graph allows the operator to see both the trend of the processing parameter and the variation at a glance. It will reveal a single machine cycle during which a parameter has an unusual value that would otherwise be hidden in an average. This display form also shows the interaction between the magnitude of the processing parameter value and the variation.

The discussion of the invention to this point has focused on the application of the operator interface and process monitor to a single IBM machine. The invention is also applicable to a system having a plurality of IBM machines.

Figure 23:
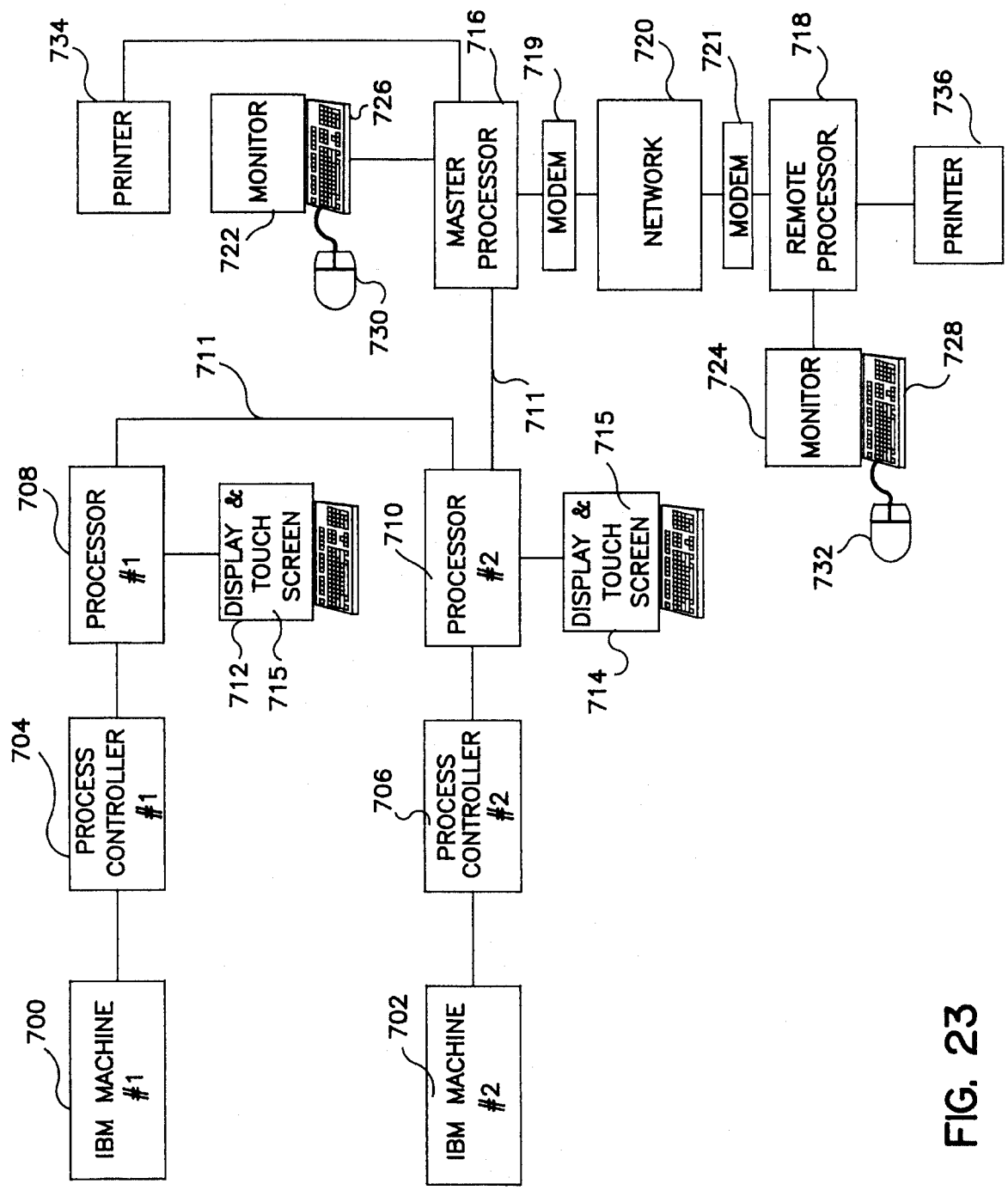
FIG. 23 is a block diagram of an exemplary system in accordance with the invention which includes a plurality of injection blow molding machines.

FIG. 23 shows a further exemplary embodiment of the invention in which IBM machines 700 and 702 are each controlled by respective process controllers 704 and 706 and respective processors 708 and 710. Although the following discussion is directed at a two IBM machine system, it is understood by those skilled in the art that any number of IBM machines having respective processors may be incorporated within the system in accordance with the principles of the invention explained herein. Each processor 708 and 710 includes a respective monitor 712 and 714 for displaying data and for receiving operator inputs. Each monitor 712 and 714 has a respective pointing device, such as touch screens 713 and 715. Each processor 708 and 710 runs the same integrated control system (ICS) software as described earlier, and as listed in the microfiche appendix. Additional software products are used to support communications and network operations. In the exemplary embodiment, these additional products include VBTools, Muscle and VBNET, by the Microhelp company of Marietta, Ga., Carbon Copy+ by the Micro Comm Company of Norwood Mass., Lantastic, by the Artisoft Company of Tucson, Ariz., and MWDriver by Opto 22 of Temecula, Calif. Processors 708 and 710 do not have local hardcopy printers. Processors 708 and 710 are linked by a network 711 running a conventional local area network protocol, such as Ethernet™.

A master processor 716 is coupled to processor 710 via the Ethernet™ 711. The master processor 716 executes the process monitor software described above with reference to FIG. 17–FIG. 25b. Users of the master processor 716 do not have access to the operator interface software described above with reference to FIG. 2–FIG. 17, for safety reasons. Master processor 716 may be located in a separate area or a separate room from IBM machines 700 and 702. As such, allowing control of an IBM machine from a remote location presents unacceptable risk to human safety.

Master processor 716 has a monitor 722. The user of master processor 716 may be a supervisor or a manager. Depending on the expected user of the master processor, it may be desirable to use a pointing device such as mouse 730, instead of a touch screen. Master processor 716 also has a printer 734. A local area network program (such as Lantastic) runs on each of processors 708, 710 and 716.

Master processor 716 is used as a single print server for the operator control processors 708 and 710. When the operator of either machine 700 or machine 702 creates hardcopy output data by touching the batch print button 314 or summary report button 316 (as shown in FIG. 1), the output data are routed to master processor 716, and printed on printer 734. This is particularly advantageous if the hardcopy is printed in an office area, where paper is routinely handled and stored, instead of on the manufacturing floor. And each time an additional IBM machine is added, the cost of an additional printer is saved using this method.

Master processor 716 also serves as a single backup data repository. Each time processing parameter data is transmitted from machine 700 (or 702) to processor 708 (or 710) for display and storage, the same processing parameter data are also copied and transmitted to a network disk drive, from which they may be accessed by master processor 716.

Finally, master processor 716 acts as a central monitoring station, from which processing parameters from any IBM machine 700 or 702 may be viewed. The information flow from processors 700 and 702 to master processor 716 is essentially one-way. As stated above, master processor 716 is prohibited from commanding any of the IBM machines 700 or 702. This ensures that no commands are issued to the machines 700 or 702 from outside of the machine area without the knowledge of any personnel stationed near the machine.

A control system in accordance with the invention results in a reduced network traffic load between the master processor 716 and processors 708 and 710. In the exemplary embodiment, statistical process control (SPC) records are written to the disks of processors 708 and 710 every 90 seconds. The SPC records include data collected during 6 IBM machine cycles of 15 seconds each. The same data are also stored redundantly in the disk drive of the master processor 716 at the same time they are stored in processors 708 and 710. This smooths the traffic load, so that network traffic is substantially independent of requests to review trend data at master processor 716. When master processor 716 is commanded to display such trend data, the SPC records are already available in the local storage of master processor. This reduces the time required to display the trend data, compared to systems in which the trend data are sent over the network at the time the display command is entered at the master processor 716. In fact, because of this traffic smoothing effect, the network software runs efficiently in each processor 708, 710, and 716, without the need for a fileserver.

Figure 24:
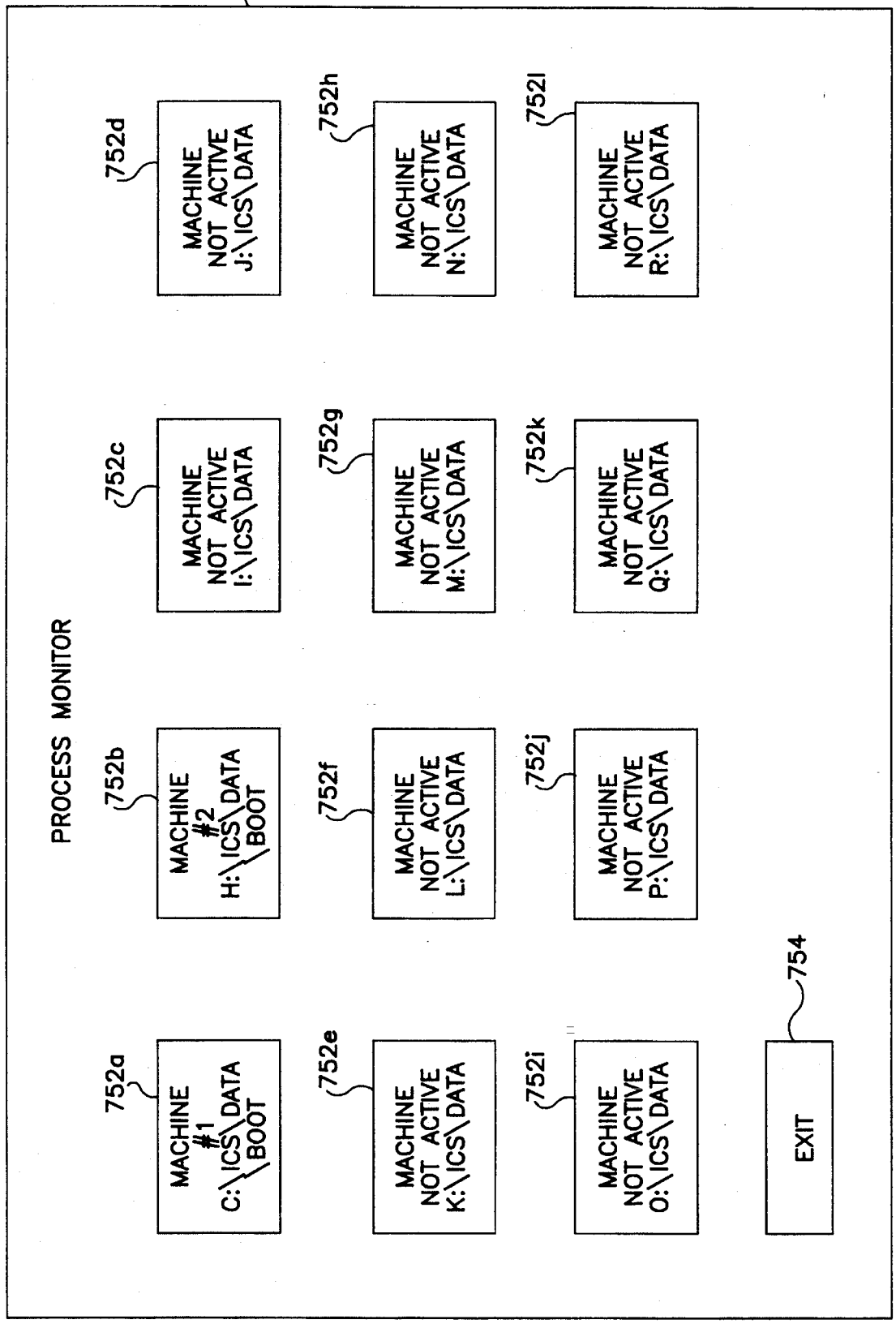
FIG. 24 shows an additional menu window used in the system shown in FIG. 23.

When the process monitor software is initiated on monitor 722, a window 750 (as shown in FIG. 24) is displayed. Window 750 includes a command button 752a–l for each IBM machine 700 or 702 in the system, including machines which are not active (i.e., turned off or in maintenance). When one of the command buttons 752a–l is selected, the monitor 722 attached to master processor 716 displays the main menu window 100 (as shown in FIG. 1) for the IBM machine selected (e.g., machine 700). The display means in processor 708 for the selected machine 700 transmits signals to master processor 716 which cause master processor 716 to display on monitor 722 the same icons, values and alarm message as displayed on monitor 712.

Referring again to FIG. 23, an additional remote processor 718 may be coupled to the master processor 716 using Carbon Copy Plus software and modems 719 and 721 to transfer the data over a voice telephone line 720. Remote processor 718 has a monitor 724 and may have a printer 736 and a pointing device 732, which may be a mouse. Remote processor 718 is functionally similar to master processor 716 in that the flow of data is from processors 708 and 710 to remote processor 728. Using the Carbon Copy Plus software, the remote processor 718 takes control of the keyboard 726 and input device 730 of master processor 716. The same images that are displayed on the monitor 722 of master processor 716 are transferred, via modems 719 and 721 and telephone lines 720 to remote processor 718. The Signals transmitted from master processor 716 to remote processor 718 cause the remote processor to display the icons, the processing parameter values and the alarm message (as shown in FIG. 17) on monitor 724 of remote processor 718.

Remote processor 718 does not command the machines 700 or 702. As is the case for master processor 716, remotely located personnel are prohibited from commanding the IBM machines 700 or 702 to ensure the safety of personnel stationed near the IBM machines. Remote processor may be useful in a number of situations. For example, in an operation with production and engineering personnel located at separate facilities, engineering personnel may monitor the performance of the system at the engineering site.

Although master processor 716 and remote processor 718 are prohibited from commanding processors 708 and 710, master processor and remote processor may issue commands to one another. For example, either processor 716 or 718 may transmit output to the other. And a user of remote processor 718 may issue software updates to master processor 716 from the remote site. In the exemplary embodiment, master processor 716 executes the Carbon Copy Host program and remote processor 718 executes the Carbon Copy guest program. Remote processor 718 issues commands to the master processor 716 which cause master processor 716 to send or receive files, as determined by the user of remote processor 718.

The introduction of computer networking to the IBM system does introduce potential problems which are not present in a single processor system. For example, one of processors 708 or 710 may be reset or rebooted, or a connector for a communications link may be accidentally disturbed, interrupting the connection. On the occurrence of one of these events, the local area network program running in master processor 716 may not automatically end its connection with the reset or rebooted processor 708, and may not establish a new connection. This condition goes undetected until the reset or rebooted processor 708 attempts to save data to a file in the master processor 716, or attempts to use printer 734. At this time, processor 708 experiences an error condition.

To prevent this problem from interfering with operations, the system includes a trap to respond to an error due to a network service request by a processor 708 for which network 720 does not recognize a connection. When the error condition is detected, an unconditional jump is made to a recovery routine in processor 708 (for which the code is listed in the microfiche appendix) which automatically disconnects processor 708 from the local area network and automatically establishes a new connection between processor 708 and the local area network. Network drives are re-allocated. Control is then returned to the operations which were interrupted by the error condition.

A similar trap is provided in the master processor 716. In the event that a faulty connection is detected by master processor 716 while attempting to fetch data from processor 708, Master Processor 716 disconnects itself from the local area network and a new connection is established automatically.

Figure 26:
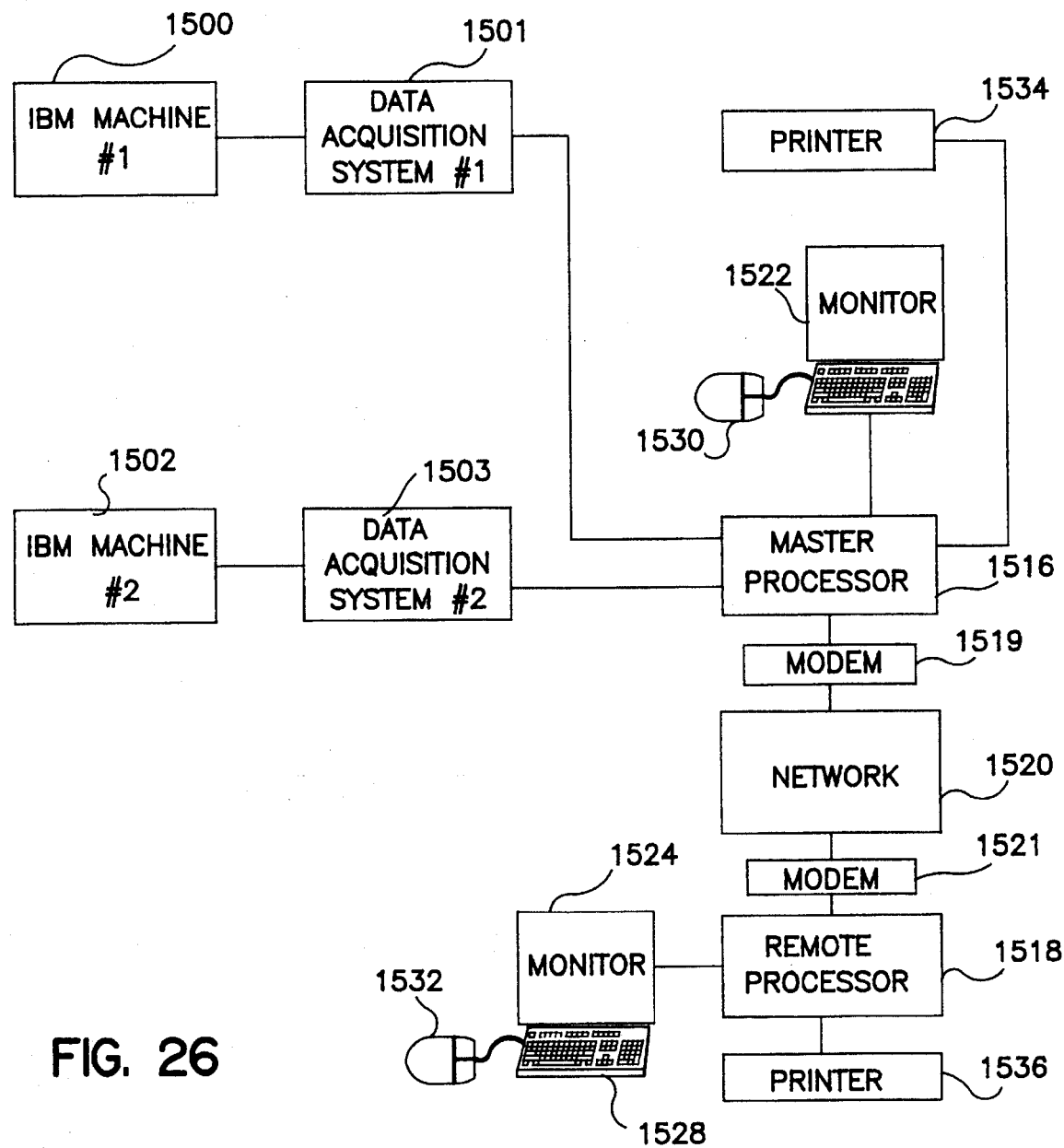
FIG. 26 is a block diagram of a further exemplary embodiment of the invention.

Referring to FIG. 26, an important aspect of the present invention is the use of the processor 708 software and hardware to set the processing parameters used by the process controller 704. An equally important aspect is the use of processors 716 and 718 to control the data collection. As described above, master processor 716 and remote processor 718 do not actively change the processing parameters used by the process controllers 704 and 706. They only use the data collected by process controller 704 and 706 under the control of respective processors 708 and 710. It is understood by those skilled in the art that the process monitor software may be used as a standalone system for monitoring the injection blow molding process in machines that are not controlled by the ICS software. The functions of the master processor FIG. 26 is a block diagram of a further exemplary embodiment of the invention. In the embodiment of FIG. 26, the process monitor software runs as a standalone system for collecting, analyzing, processing and storing process data from a plurality of data acquisition systems (DASs) 1501 and 1503. The data acquisition systems 1501 and 1503 may be conventional systems, such as the G4LC4 processor manufactured by the Opto 22 company, or the DAS08 PGL manufactured by the Computer Board company, The process monitor software controls how the raw data collected (which may be, for example, analog voltage signals output by transducers within machines 1500 and 1502) by the data acquisition systems 1501 and 1502 are converted to meaningful trend data.

Figure 27:
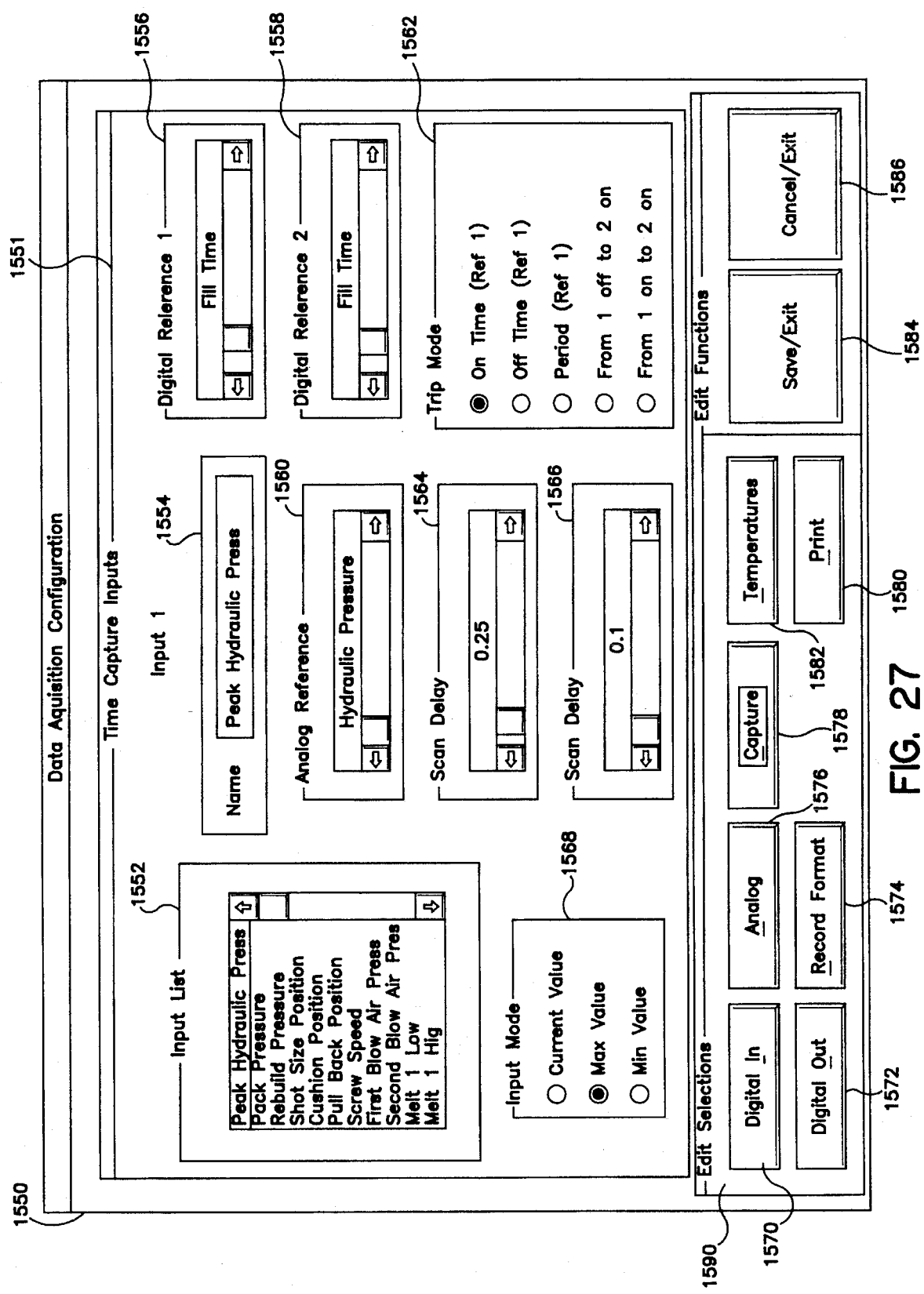
FIGS. 27 through 29 show menus which are displayed in the embodiment of the invention shown in FIG. 26.
Figure 28:
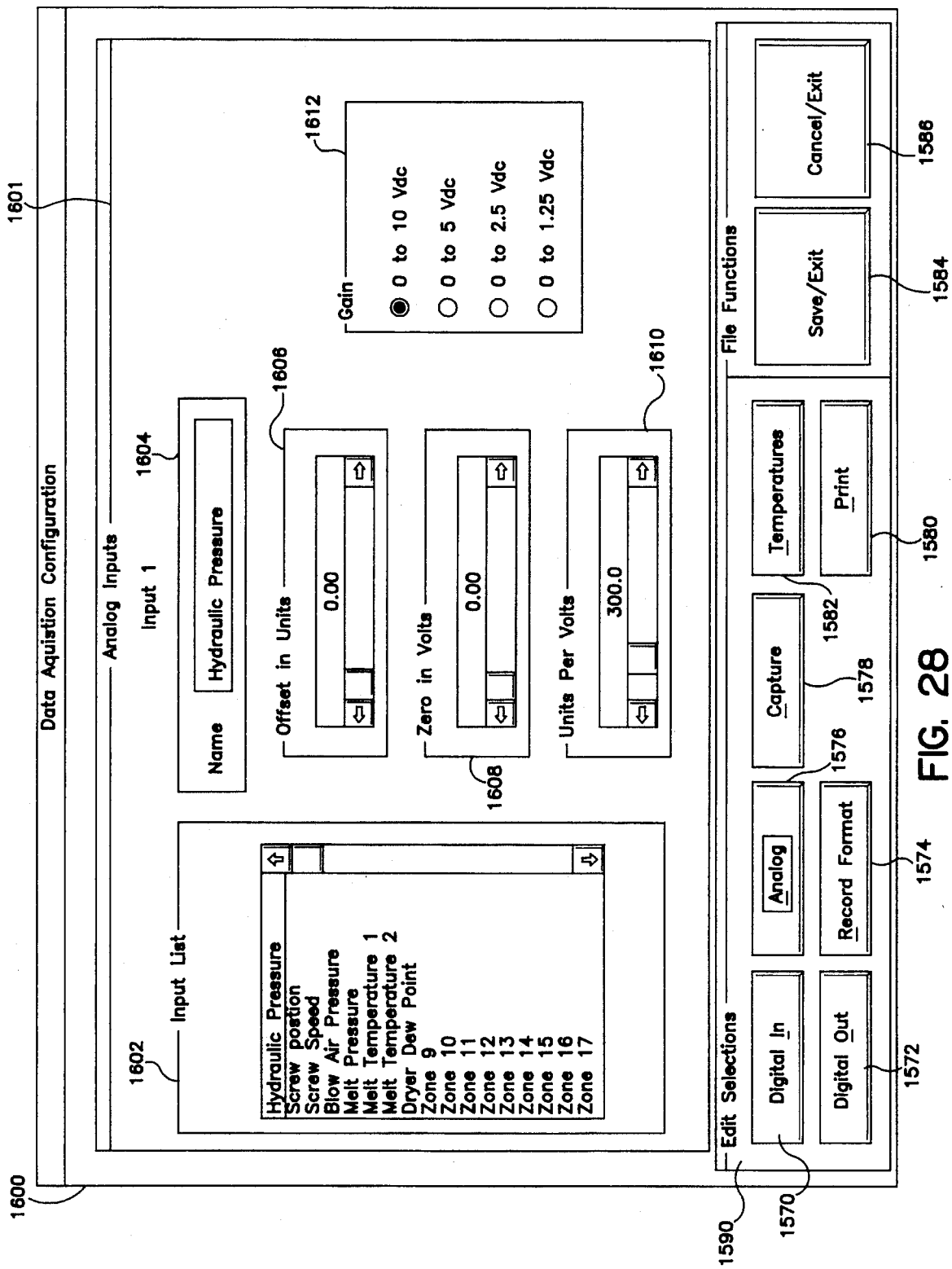
Figure 29:
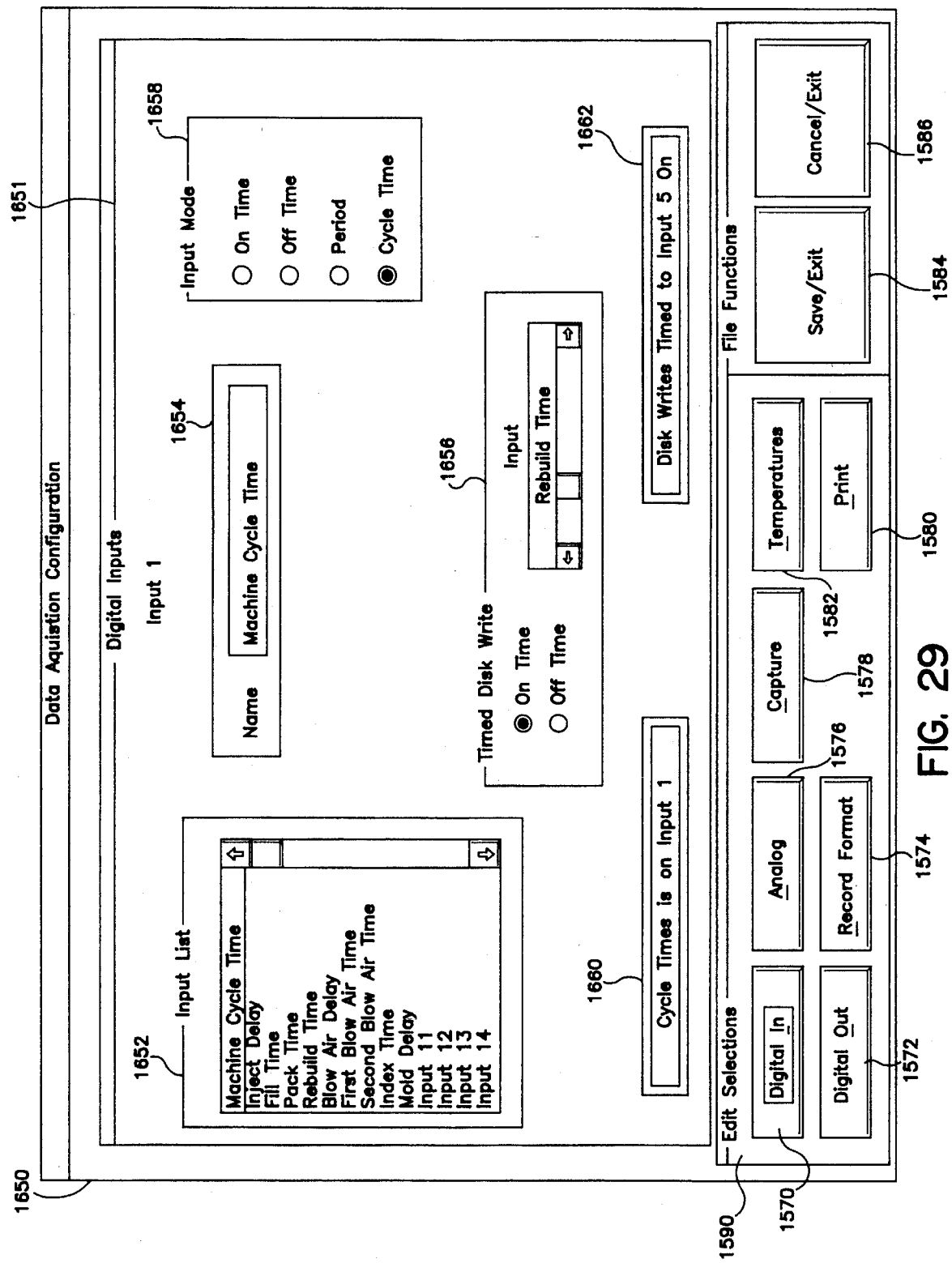

FIG. 27 through FIG. 29 show three additional screens 1550, 1600, and 1650 which are displayed on respective monitors 1522 and 1524 when the process monitor is used as a standalone system in master processor 1516 and remote processor 1518, as shown in FIG. 26. These screens are used to configure processor 1516 to receive and manipulate the data provided by the respective DASs 1501 and 1503. It is noted that in the discussion up to this point, the configuration of sensors and transducers controlled and/or monitored by the operator interface software and the process monitor has been fixed by hard-coding the identifications into the software. The data acquisition configuration function discussed below with reference to FIG. 27 through FIG. 29 removes this restriction of hardcoding the processing parameters for the process monitor software. It is understood by those skilled in the art that a similar function may be added to the operator interface software program of the ICS to allow changes to the configuration of sensors monitored at program execution time.

When the user runs the configuration function for the process monitor in standalone mode, a menu is displayed similar to the menu shown in FIG. 24, except that selection of one of the buttons causes the data acquisition configuration menus of FIG. 27 through FIG. 29 to be displayed, instead of main process monitor menu 100 shown in FIG. 17.

FIG. 27, shows a data acquisition configuration menu 1650 for selecting the data capture information for a respective parameter. The top portion 1551 is unique to the time capture inputs menu. The bottom portion 1590 is common to the data acquisition configuration menus shown in FIG. 27 through FIG. 29. A list box 1552 lists the parameter names. Existing parameter names may be modified using the list box 1552. New parameter names are entered in field 1554. Fields 1560, 1556 and 1558 are used to enter an analog reference parameter and two digital reference parameters that are associated with the process parameter identified in field 1554. The scan delay field 1564 controls the time between the event that triggers the scan and the beginning of the scan itself. The scan time field 1566 identifies the amount of time during which the scan occurs. The input mode field 1568 determines which value of the parameter is used: the maximum value observed during the scan interval, the minimum value observed during the interval, or the current average value at the time the data are transferred to processor 1516 or 1518. The trip mode field 1562 identifies a triggering event based on the respective on or off times of the reference parameters identified in fields 1556 and 1558.

The bottom portion 1590 of the data acquisition configuration menu allows the user to switch between the menus shown in FIG. 27 (by selecting button 1578), FIG. 28 (by selecting button 1576), FIG. 29 (by selecting button 1570) or various outputs (not shown) by selecting buttons 1572, 1574, 1580, or 1582. A save button 1584 causes processor 1516 or 1518 to implement the changes input to the menu.

FIG. 28 shows an analog input menu 1600 for inputting the parameters defining the analog reference shown in field 1560 of FIG. 27. This menu is displayed in response to selecting command button 1576 from another menu. For the analog input parameters, DASs 1501 and 1503 provide analog voltage signals for these parameters. The user inputs the parameter name in field 1604 (which is then added to list box 1602), and the units per volt of the input signal in field 1610. A voltage value corresponding to a measure of zero for the parameter being monitored is input at field 1608. Alternatively, an offset value in the units being measured may be entered in field 1606. When a value is input by the user for either field 1606 or field 1608, the other of the two parameters is automatically calculated, based on the units per volt 1610 and the value of the field 1606 or 1608 already entered. The range (in volts) of the analog sensor is selected in field 1612.

FIG. 29 shows a digital input menu 1650 which is displayed in response to selection of command button 1570 from another menu (e.g., menu 1550 or menu 1600). The name of the input parameter is input at field 1654. Field 1658 is used to select the mode for collecting the input data: when the device is turned on, when it is turned off, when the device goes through a period of operation, or on the basis of a predetermined cycle time. Field 1656 is used to determine when the data are actually written to disk.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. In an injection blow molding apparatus including a plurality of injection blow molding machines, each machine having a plurality of work stations and a plurality of molds, said molds including injection molds and blow molds, wherein work pieces in each machine are first injection molded, then blown and removed at successive work stations, the improvement comprising:

a plurality of process controllers and a plurality of processors for operating said plurality of machines, each of said process controllers coupled to a respective machine and to a respective processor and operating in accordance with a respective set of processing parameters, each processing parameter in each respective set having a respective desired operating range;

a plurality of monitors, each of said monitors coupled to a respective processor, each of said monitors displaying a plurality of command buttons and icons and having a respective touch screen, each touch screen transmitting signals to said respective processor for adjusting said processing parameters;

a master processor coupled to each of said plurality of processors, said master processor having a monitor, wherein each respective processor transmits a respective set of signals to said master processor representing a respective set of processing parameters being used by the respective one of said process controllers which is coupled to said respective processor, and wherein said master processor includes:

main menu means for causing said master processor to display a plurality of command buttons, each button representing a respective machine, for selecting one of said machines for which a respective one of said sets of processing parameters is to be displayed by said master processor, display means for displaying a plurality of icons, each icon representing a respectively different processing parameter from said selected machine, and for displaying, adjacent to each of said icons, the value of each respective processing parameter, and alarm means for displaying an alarm message identifying whether any one of said processing parameters in said selected machine is operating outside its desired operating range, wherein said master processor and each one of said plurality of processors are coupled to a network, and each one of said plurality of processors includes:

means for detecting an error condition which prevents said one processor from transmitting data to said master processor;

means for automatically disconnecting said one processor from said network in response to said error condition; and means for automatically establishing a new connection between said processor and said network, whereby said error condition is corrected.

2. Injection blow molding apparatus in accordance with claim 1, wherein each of the machines includes a monitor having a a touch screen, said touch screen transmitting signals to said processor of said machine for adjusting said processing parameters.

3. Injection blow molding apparatus in accordance with claim 2, wherein each of the machines includes display means coupled to said control means for causing said monitor to display an icon in the form of a picture of a portion of said machine, said icon representing a selected processing parameter and, adjacent to said icon, the value of said selected processing parameter.

4. Injection blow molding apparatus in accordance with claim 3, wherein each of the machines includes graphing means for transmitting to said monitor signals which cause said monitor to display a graph of said selected processing parameter value plotted as a function of time in response to an operator touching a portion of said touch screen beneath which said icon is displayed.

5. Injection blow molding apparatus in accordance with claim 4, wherein each of the machines includes alarm means coupled to said control means for causing said monitor to display an alarm message identifying whether any one of said processing parameters is operating outside its desired operating range 6. Injection blow molding apparatus in accordance with claim 1, in which the master processor includes graphing means for transmitting to said master processor monitor signals which cause said monitor to display a graph of a selected processing parameter value plotted as a function of time in response to an operator touching a portion of the touch screen of the master processor beneath which said icon is displayed.

7. Injection blow molding apparatus in accordance with claim 6, further comprising:

storage means for storing data, wherein the graphing means comprises:

means for retrieving from the storage means a set of previously stored data values for the selected processing parameter;

means for assigning said data values to a plurality of subgroups, each respective subgroup having data values collected during an interval of time;

means for selecting a minimum value and a maximum value from one of said subgroups which is collected during said one interval; and means for generating signals which cause said monitor to display a line segment extending from said minimum value to said maximum value, said line segment having a time coordinate equal to a time at which said data values within said subgroup were previously stored.

8. Injection blow molding apparatus in accordance with claim 6, wherein said master processor includes means for transmitting to said monitor of said master processor signals which cause said monitor to display a menu command button, wherein said icon and said value are displayed in response to an operator touching one of said portions of the touch screen of the master processor beneath which said menu command button is displayed.

9. Injection blow molding apparatus in accordance with claim 6, wherein said graph is displayed for a range of time coordinates, and wherein said graphing means include:

means for transmitting signals which cause said monitor to display a forward command button and a backward command button for changing said range of time coordinates for which said graph is displayed, in response to an operator touching one of said portions of said touch screen beneath which said forward command button and said backward command button are displayed.

10. Injection blow molding apparatus in accordance with claim 1, wherein said alarm means transmits to the monitor of the master processor signals which cause said alarm message to be displayed as text on a background field, said background field having a first color while each respective processing parameter value is within a respective desired operating range, said background field having a second color while any one of said processing parameter values exceeds a maximum value in said desired operating range, said background field having a third color while any one of said processing parameter values is less than a minimum value in said desired operating range.

11. Injection blow molding apparatus in accordance with claim 1, wherein said alarm message is displayed continuously.

12. Injection blow molding apparatus in accordance with claim 1, wherein said value of said selected processing parameter is displayed in the form of text on a background field, said background field having a first color while said value is within its desired operating range, said background field having a second color while said value exceeds a maximum value in said desired operating range, said background field having a third color while said value is less than a minimum value in said desired operating range.

13. Injection blow molding apparatus in accordance with claim 1, wherein said display means include means for displaying said icon and said value within a window on said monitor.

14. Injection blow molding apparatus in accordance with claim 13, wherein said alarm means include means for displaying said alarm message within said window.

15. Injection blow molding apparatus in accordance with claim 13, wherein said window is sized to fill said monitor.

16. Injection blow molding apparatus in accordance with claim 1, wherein each machine includes:

a barrel, a nozzle and a manifold, each having a respective temperature sensor, wherein said display means cause the monitor of the master processor to display a respective temperature icon and a respective temperature data value measured by the sensor in each of said barrel, said nozzle and said manifold of said selected machine.

17. Injection blow molding apparatus in accordance with claim 1, wherein each of said molds of said selected machine has a temperature sensor, said blow mold has an air pressure sensor, and said display means transmit signals which cause said monitor of said master processor to display, for each respective mold, a temperature icon and a temperature data value measured by the respective temperature sensor, and cause said blow mold to display an air pressure icon and an air pressure data value measured by the air pressure sensor.

18. Injection blow molding apparatus in accordance with claim 1, wherein said selected machine includes an injection screw having a pressure sensor, and wherein said display means transmit signals which cause said monitor of said master processor to display a pressure icon and a pressure data value measured by said injection screw pressure sensor.

19. In an injection blow molding apparatus including a plurality of injection blow molding machines, each machine having a plurality of work stations and a plurality of molds, said molds including injection molds and blow molds, wherein work pieces in each machine are first injection molded, then blown and removed at successive work stations, the improvement comprising:

a plurality of process controllers and a plurality of processors for operating said plurality of machines, each of said process controllers coupled to a respective machine and to a respective processor and operating in accordance with a respective set of processing parameters, each processing parameter in each respective set having a respective desired operating range;

a plurality of monitors, each of said monitors coupled to a respective processor, each of said monitors displaying a plurality of command buttons and icons and having a respective touch screen, each touch screen transmitting signals to a respective processor for adjusting said processing parameters;

a master processor coupled to each of said plurality of processors, said master processor having a monitor, wherein each respective processor transmits a respective set of signals to said master processor representing a respective set of processing parameters being used by the respective one of said process controllers which is coupled to said respective processor;

a remote processor coupled to said master processor, said remote processor having a monitor, wherein said master processor transmits a respective set of signals to said remote processor representing the respective set of processing parameters received by the master processor, wherein said master processor and said remote processor each include:

main menu means for displaying a plurality of command buttons, each button representing a respective machine, for selecting one of said machines for which a respective one of said sets of processing parameters is to be displayed, display means for displaying a plurality of icons, each icon representing a respectively different processing parameter from said selected machine, and for displaying, adjacent to each of said icons, the value of its respective parameter, and alarm means for displaying an alarm message identifying whether any one of said processing parameters in said selected machine is operating outside its desired operating range, wherein said master processor, said remote processor and each one of said plurality of processors are coupled to a network, and each one of said plurality of processors includes:

means for detecting an error condition which prevents said one processor from transmitting data to said master processor;

means for automatically disconnecting said one processor from said network in response to said error condition; and means for automatically establishing a new connection between said processor and said network, whereby said error condition is corrected.

20. Injection blow molding apparatus in accordance with claim 19, wherein the master processor is commanded from said remote processor.

21. In an injection blow molding apparatus including an injection blow molding machine having a plurality of work stations and a plurality of molds, which include injection molds and blow molds, wherein work pieces are first injection molded, then blown and removed at successive work stations, the machine including an injection screw having a pressure sensor and a position sensor, the apparatus including control means for operating said machine in accordance with a set of processing parameters, each processing parameter having a respective desired operating range, the improvement comprising:

a monitor having a a touch screen, said touch screen transmitting signals to said control means for adjusting said processing parameters;

display means coupled to said control means for causing said monitor to display an icon in the form of a picture of a portion of said machine, said icon representing a selected processing parameter and, adjacent to said icon, the value of said selected processing parameter, the display means including means for displaying a transfer mode control switch on said monitor;

graphing means for transmitting to said monitor signals which cause said monitor to display a graph of said selected processing parameter value plotted as a function of time in response to an operator touching a portion of said touch screen beneath which said icon is displayed;

alarm means coupled to said control means for causing said monitor to display an alarm message identifying whether any one of said processing parameters is operating outside a desired operating range;

means for transmitting signals to operate the machine in response to an operator touching a portion of said touch screen beneath which said transfer mode control switch is displayed, so that the injection mold is filled according to either one of a desired transfer pressure profile and a desired screw velocity profile;

means for measuring and displaying the position of the injection screw when the injection mold is filled, if the transfer pressure profile is used to control injection mode filling.

22. Injection blow molding apparatus in accordance with claim 21, wherein said alarm means transmits to said monitor signals which cause said alarm message to be displayed as text on a background field, said background field having a first color while each respective processing parameter value is within its respective desired operating range, said background field having a second color while any one of said processing parameter values exceeds a maximum value in said desired operating range, said background field having a third color while any one of said processing parameter values is less than a minimum value in said desired operating range.

23. Injection blow molding apparatus in accordance with claim 22, wherein said alarm message is displayed continuously.

24. Injection blow molding apparatus in accordance with claim 23 wherein said alarm means include means for displaying said alarm message within a window on said monitor.

25. In an injection blow molding apparatus including an injection blow molding machine having a plurality of work stations and a plurality of molds, which include injection molds and blow molds, wherein work pieces are first injection molded, then blown and removed at successive work stations, and including control means for operating said machine in accordance with a set of processing parameters, each processing parameter having a respective desired operating range, the improvement comprising:

a monitor having a a touch screen, said touch screen transmitting signals to said control means for adjusting said processing parameters;

display means coupled to said control means for causing said monitor to display an icon in the form of a picture of a portion of said machine, said icon representing a selected processing parameter and, adjacent to said icon, the value of said selected processing parameter;

graphing means for transmitting to said monitor signals which cause said monitor to display a graph of said selected processing parameter value plotted as a function of time in response to an operator touching a portion of said touch screen beneath which said icon is displayed, wherein the graphing means comprises:

(1) means for retrieving from the storage means a set of previously stored data values for the selected processing parameter, (2) means for assigning said data values to a plurality of subgroups, each respective subgroup having data values collected by said control means during an interval of time, (3) means for selecting a minimum value and a maximum value from one of said subgroups which is collected during said one interval, and (4) means for generating signals which cause said monitor to display a line segment extending from said minimum value to said maximum value, said line segment having a time coordinate equal to a time at which said data values within said subgroup were previously stored; and alarm means coupled to said control means for causing said monitor to display an alarm message identifying whether any one of said processing parameters is operating outside a desired operating range, said alarm means transmitting to said monitor signals which cause said alarm message to be displayed as text on a background field, said background field having a first color while each respective processing parameter value is within a respective desired operating range, said background field having a second color while any one of said processing parameter values exceeds a maximum value in said desired operating range, said background field having a third color while any one of said processing parameter values is less than a minimum value in said desired operating range.

* * * * *